US008109302B2

(12) United States Patent
Borne et al.

(10) Patent No.: US 8,109,302 B2
(45) Date of Patent: Feb. 7, 2012

(54) SYSTEM AND METHOD FOR TRIMMING WOOD BLOCKS

(75) Inventors: Larry Borne, Prince George (CA); Dean Kopp, Williams Lake (CA); Patrick Glazier, Prince George (CA)

(73) Assignee: 0788490 B.C. Ltd., Prince George, British Columbia (CA)

( * ) Notice: Subject to any disclaimer, the term of this patent is extended or adjusted under 35 U.S.C. 154(b) by 511 days.

(21) Appl. No.: 11/771,210

(22) Filed: Jun. 29, 2007

(65) Prior Publication Data

US 2008/0257451 A1 Oct. 23, 2008

Related U.S. Application Data

(60) Provisional application No. 60/913,386, filed on Apr. 23, 2007.

(30) Foreign Application Priority Data

Apr. 20, 2007 (CA) ...................................... 2585943

(51) Int. Cl.
*B27C 9/00* (2006.01)
(52) U.S. Cl. ...................................... 144/1.1
(58) Field of Classification Search ............... 144/2.1, 144/1.1, 3.1, 242.1, 245.1, 245.6, 245.3; 83/423
See application file for complete search history.

(56) References Cited

U.S. PATENT DOCUMENTS

| | | | |
|---|---|---|---|
| 3,856,061 A | 12/1974 | Miles | |
| 3,927,705 A | 12/1975 | Cromeens et al. | |
| 4,800,938 A | 1/1989 | Coombs | |
| 4,813,465 A | 3/1989 | Nowakowski | |
| 4,869,360 A | 9/1989 | Brown et al. | |
| 5,617,910 A * | 4/1997 | Hill | 144/356 |
| 5,761,979 A * | 6/1998 | McGehee | 83/425.3 |
| 6,082,421 A * | 7/2000 | Nicol et al. | 144/90.1 |
| 6,084,184 A * | 7/2000 | Troisi | 177/145 |
| 6,173,829 B1 | 1/2001 | Jackson et al. | |
| 6,189,682 B1 | 2/2001 | Hill | |
| 6,568,523 B2 | 5/2003 | Stibbard | |
| 6,701,984 B2 | 3/2004 | Lamontagne et al. | |
| 6,705,190 B2 | 3/2004 | Newnes et al. | |
| 6,945,410 B2 | 9/2005 | Stibbard | |
| 6,997,305 B2 | 2/2006 | Demarest et al. | |
| 7,134,465 B2 | 11/2006 | Herring et al. | |
| 2006/0231370 A1 * | 10/2006 | Cesselli et al. | 198/339.1 |

FOREIGN PATENT DOCUMENTS

| | | |
|---|---|---|
| CA | 2292296 | 12/1999 |
| CA | 2297644 | 1/2000 |
| CA | 2328338 | 12/2000 |
| CA | 2236508 | * 5/2004 |

* cited by examiner

*Primary Examiner* — Dana Ross
*Assistant Examiner* — Matthew G Katcoff
(74) *Attorney, Agent, or Firm* — Michael G. Johnston; Moore & Van Allen PLLC

(57) ABSTRACT

There is disclosed a system, apparatus and method for preparing wood blocks. The embodiments disclosed may comprise paddle designs, trimming unit designs and methods, scanner unit designs and methods, for use in the trimming of wood blocks. The blocks may be used for finger jointing.

32 Claims, 25 Drawing Sheets

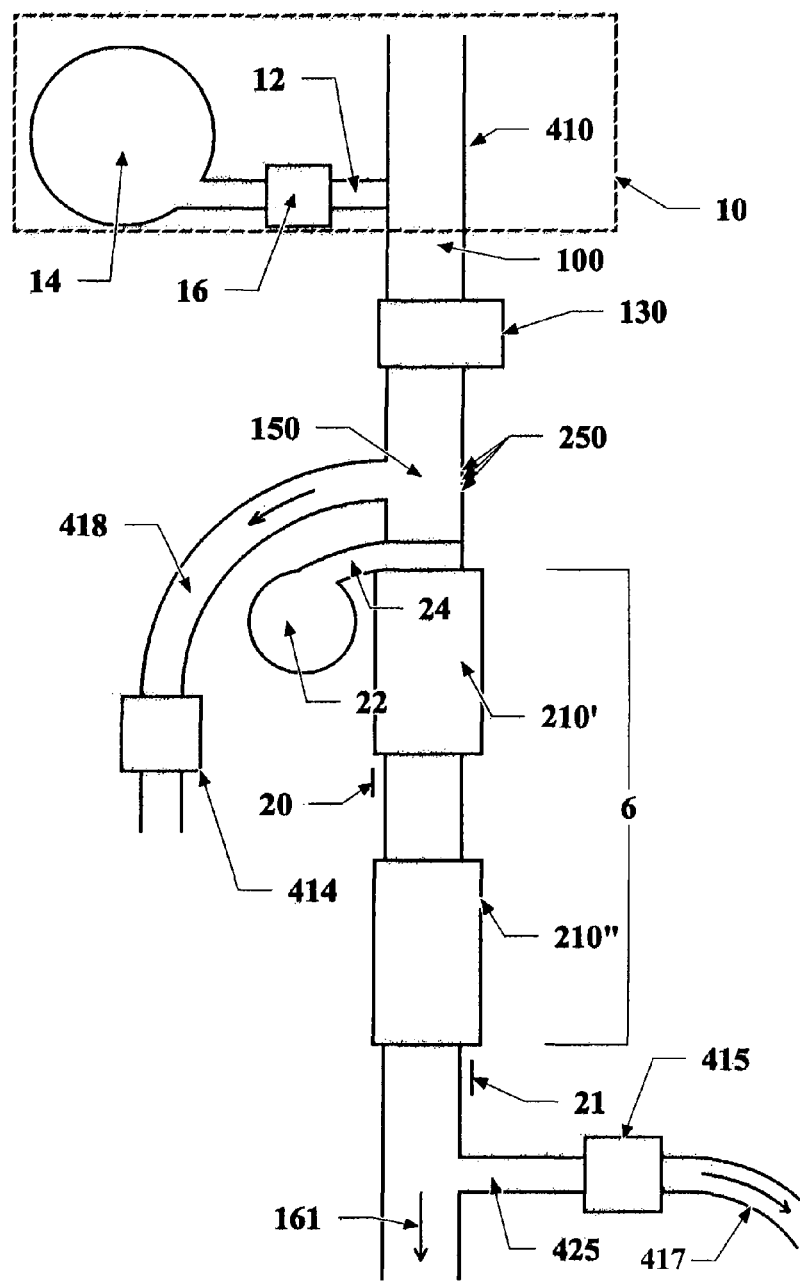

SYSTEM AND METHOD FOR TRIMMING WOOD BLOCKS

FIELD

The embodiments disclosed relate to systems and methods for trimming wood blocks and to wood blocks produced using such systems and methods.

BACKGROUND

The prior art discloses a range of units for use in the preparation of wood blocks for finger jointing. U.S. Pat. No. 4,813,465 to Nowakowski discloses a system for automatically determining the end profiles of blocks and rejecting blocks with unacceptable profiles; U.S. Pat. No. 3,856,061 to Miles and U.S. Pat. No. 6,705,190 to Newnes disclose methods for cutting lumber to specified lengths; and U.S. Pat. No. 6,173,829 to Jackson et al discloses a circulating paddle positioning fence.

SUMMARY

In a first embodiment there is disclosed an apparatus for trimming a wood block that may comprise: a first conveyor having a first direction of travel and a first conveyor surface and comprising two conveyor chains, the conveyor chains together defining an open space therebetween; an infeed for delivering onto the first conveyor a wood block extending between first and second ends; a scanner unit for scanning the wood block on the first conveyor and comprising a first sensor and a first processor, the first sensor being operatively connected to the first processor for calculating a solution for the wood block; wherein the conveyor chains are narrow relative to the space between the conveyor chains so that sufficient scanning information can be derived for the processor to calculate the solution; and a trimming unit actuable by the first processor and comprising: a second conveyor having first and second lateral edges and a second conveyor surface and a second direction of travel; a wood block positioner comprising a first paddle moveable transversely inwardly across the second conveyor surface; and a first trimsaw for trimming the first end of the wood block.

In alternative embodiments the trimming unit may comprise a second paddle and a second trimsaw and wherein the second paddle is actuable by the first processor to position the wood block for the second trimsaw to trim the second end.

In alternative embodiments sufficient scanning information can be derived when the block passes through the scanner unit once.

In alternative embodiments the apparatus may further comprise a ripsaw feed substantially at right angles to the second conveyor carrying the trimmed wood block.

In alternative embodiments the apparatus may further comprise a kicker actuable by the first processor to eject the wood block when the first processor determines that there is no solution for the wood block that satisfies predetermined parameters.

In alternative embodiments one of the first and second conveyors has a plurality of associated locations for receiving individual ones of the wood blocks and the apparatus may further comprise: a reservoir for holding a second wood block extending longitudinally between first and second ends and for which an acceptable solution is calculable by the first processor; a second processor for tracking the location associated with the second wood block; and a second infeed operably connected to and actuable by the second processor for delivering the second wood block into the location transversely to the second direction of travel if the wood block has been ejected.

In alternative embodiments the location is defined by a lug.

In alternative embodiments the apparatus may further comprise: a third sensor and a third processor operatively connected to identify vacant locations on one of the first and second conveyors; a reservoir for holding the second wood block extending longitudinally between first and second ends and for which the acceptable solution is calculable; and a third infeed for transversely delivering the second wood block into the vacant locations the third infeed being actuable by the second processor to deliver the second wood block to fill the vacant location on one of the first and second conveyors.

In alternative embodiments the first paddle has an end part and the end part is flexible.

In alternative embodiments the first paddle is a brush.

In alternative embodiments the brush has bristles and the bristles are between about 0.04 and about 0.08 inches in diameter.

In alternative embodiments an individual one of the conveyor chains is less than about 1 inch wide.

In alternative embodiments an individual one of the conveyor chains is about 0.5 inches wide.

In alternative embodiments the conveyor chains are bicycle chains.

In alternative embodiments there is disclosed an apparatus wherein: one of the first and second conveyors comprises a lug having a lug surface for preventing an individual one of the wood blocks from sliding backwards relative to the direction of movement of one of the first and second conveyors; a resistive member is mounted above at least one of the first and second conveyors for urging the wood block against the lug surface; and the resistive member is flexible.

In alternative embodiments the resistive member is a brush.

In alternative embodiments one of the first and second conveyors may further comprise a plurality of lugs.

In alternative embodiments there is disclosed a finger jointing system that may comprise the apparatus as disclosed above.

In alternative embodiments there is disclosed a method for trimming a wood block that may comprise trimming the wood block using the apparatus as disclosed above.

In alternative embodiments there is disclosed a wood block made using the apparatus as disclosed above.

In alternative embodiments there is disclosed the use of an that may comprise the apparatus as disclosed above to a wood block.

In alternative embodiments there is disclosed a trimming unit for trimming a wood block, the trimming unit comprising a conveyor, a processor and a wood block positioner: the conveyor being able to carry a wood block having first and second ends, the conveyor having first and second lateral edges, a conveyor surface, and an associated direction of travel; the wood block positioner actuable by the processor, and comprising a first paddle moveable along the direction of travel of the conveyor and transversely inwardly across and above the conveyor to position the first end of the wood block relative to a first trimsaw.

In alternative embodiments the trimming may further comprise a second paddle moveable against the wood block to position the second end of the wood block relative to a second trimsaw.

In alternative embodiments the trimming is preparation for finger jointing.

In alternative embodiments there is disclosed a trimming unit that may further comprise a plurality of first paddles, and wherein the wood block is associated with a location on the second conveyor and wherein an individual one of the first paddles is moveable in the second direction of travel of the second conveyor substantially synchronously with the location.

In alternative embodiments there is disclosed a trimming unit wherein: the first paddles are arranged in a first paddle array comprising a first paddle positioning fence; the first paddle positioning fence is oriented along a line converging with the second direction of travel of the second conveyor; and individual ones of the first paddles are moveable incrementally inwardly across the second conveyor surface through a continuous range of positions.

In alternative embodiments the first paddles are mounted along the paddle positioning fence on cam mounts.

In alternative embodiments there is disclosed a trimming unit that may further comprise a second paddle array comprising a second paddle positioning fence and wherein the second paddle positioning fence is oriented along a line converging with the second direction of travel of the second conveyor.

In alternative embodiments the line of the first paddle positioning fence converges with the second direction of travel of the second conveyor at an angle of between about 10 degrees and about 20 degrees.

In alternative embodiments the angle is about 15 degrees.

In alternative embodiments the first paddle has an end part and the end part is flexible.

In alternative embodiments the first paddle is a brush.

In alternative embodiments the brush has bristles and the bristles are between about 0.04 inches and about 0.08 inches in diameter.

In alternative embodiments there is disclosed a trimming unit wherein: one of the first and second conveyors comprises a lug having a lug surface for preventing an individual one of the wood blocks from sliding backwards relative to the direction of movement of one of the first and second conveyors; the trimming unit comprises a resistive member mounted above one of the first and second conveyor surfaces for urging the wood block against the lug surface.

In alternative embodiments the resistive member is a brush.

In alternative embodiments one of the first and second conveyors may further comprise a plurality of lugs.

In alternative embodiments the infeed may comprise a third conveyor substantially at right angles to the first conveyor for delivering the wood block onto the first conveyor surface transversely to the first direction of travel of the first conveyor.

In alternative embodiments there is disclosed a method for trimming a wood block that may comprise using the trimming unit as disclosed above.

In alternative embodiments there is disclosed a wood block made using the trimming unit as disclosed above.

In alternative embodiments there is disclosed the use of an apparatus comprising the trimming unit as disclosed above.

In alternative embodiments there is disclosed a scanner unit for continuously scanning wood blocks to be finger jointed, an individual wood block having a length, and the scanner unit may comprise: a first conveyor having a first direction of travel for carrying the wood blocks oriented substantially transversely to the first direction of travel and comprising two substantially parallel first conveyor chains, each having a width and a surface and together defining an open space between the surfaces; a first sensor for scanning the wood blocks while the wood blocks are being carried by the first conveyor, the first sensor being operatively connected to a processor for calculating a solution for individual ones of the wood blocks; wherein the first conveyor chains are sized relative to the space so that scanning information is sufficient for the processor to determine a solution for a wood block.

In alternative embodiments the scanner unit may further comprise a second sensor operatively connected to the first processor.

In alternative embodiments there is disclosed a scanner unit as disclosed above wherein the first sensor is positioned above the wood block and the second sensor is positioned below the wood block.

In alternative embodiments the scanning information is derived when the block makes a single pass through the scanner unit In alternative embodiments the processor identifies individual ones of the wood blocks for which no solution satisfies predetermined parameters.

In alternative embodiments individual ones of the first conveyor chains are less than about 1 inch wide.

In alternative embodiments an individual one of the conveyor chains is about 0.5 inches wide.

In alternative embodiments the first conveyor chain is a bicycle chain.

In alternative embodiments there is disclosed a scanner unit that further comprises a plurality of the first sensors and a plurality of the second sensors.

In alternative embodiments there is disclosed a method for trimming a wood block that may comprise using the scanning unit as disclosed above.

In alternative embodiments there is disclosed a wood block made using the scanner unit as disclosed above.

In alternative embodiments there is disclosed the use of an apparatus that may comprise the scanner unit as disclosed above.

In alternative embodiments there is disclosed a positioning paddle for positioning a wood block on a conveyor, the paddle comprising an extending portion having an end, the end being flexible.

In alternative embodiments the positioning paddle may further comprise a plurality of individual ends.

In alternative embodiments the paddle end comprises a brush.

In alternative embodiments the brush has bristles and an individual one of the bristles has a diameter of between about 0.04 inches and about 0.08 inches.

In alternative embodiments the paddle is mounted on a cam.

In alternative embodiments the conveyor has a surface and an edge and the paddle is moveable transversely inwardly from the edge over the surface.

In alternative embodiments the conveyor has a direction of travel and the paddle is moveable along the direction of travel substantially synchronously with the conveyor.

In alternative embodiments there is disclosed a method for positioning a wood block on a conveyor that may comprise using the positioning paddle as disclosed above.

In alternative embodiments there is disclosed a wood block made using the positioning paddle as disclosed above.

In alternative embodiments there is disclosed the use of an apparatus that may comprise the positioning paddle as disclosed above to process a wood block.

In a further embodiment there is disclosed a method for trimming a wood block having an end, the method comprising passing the wood block through a scanner on a conveyor and simultaneously scanning the wood block; calculating a solution for the wood block; and actuating a positioner to position the wood block relative to a trimsaw for trimming the end of the wood block.

In alternative embodiments the wood block may make only one pass through the scanner; or the trimming may be the sequential trimming of a plurality of wood blocks.

Features and advantages of the subject matter disclosed will become more apparent in light of the following detailed description of some embodiments thereof, as illustrated in the accompanying figures. As will be realized, the various embodiments are capable of modifications in various respects and may be combined in a variety of alternative ways, all without departing from the spirit and scope of the claims. Accordingly, the drawings and the description are to be regarded as illustrative in nature, and not as restrictive.

BRIEF DESCRIPTION OF THE DRAWINGS

FIG. 28 is a schematic view of an embodiment.

DETAILED DESCRIPTION OF EMBODIMENTS

Definitions

Figure 1:
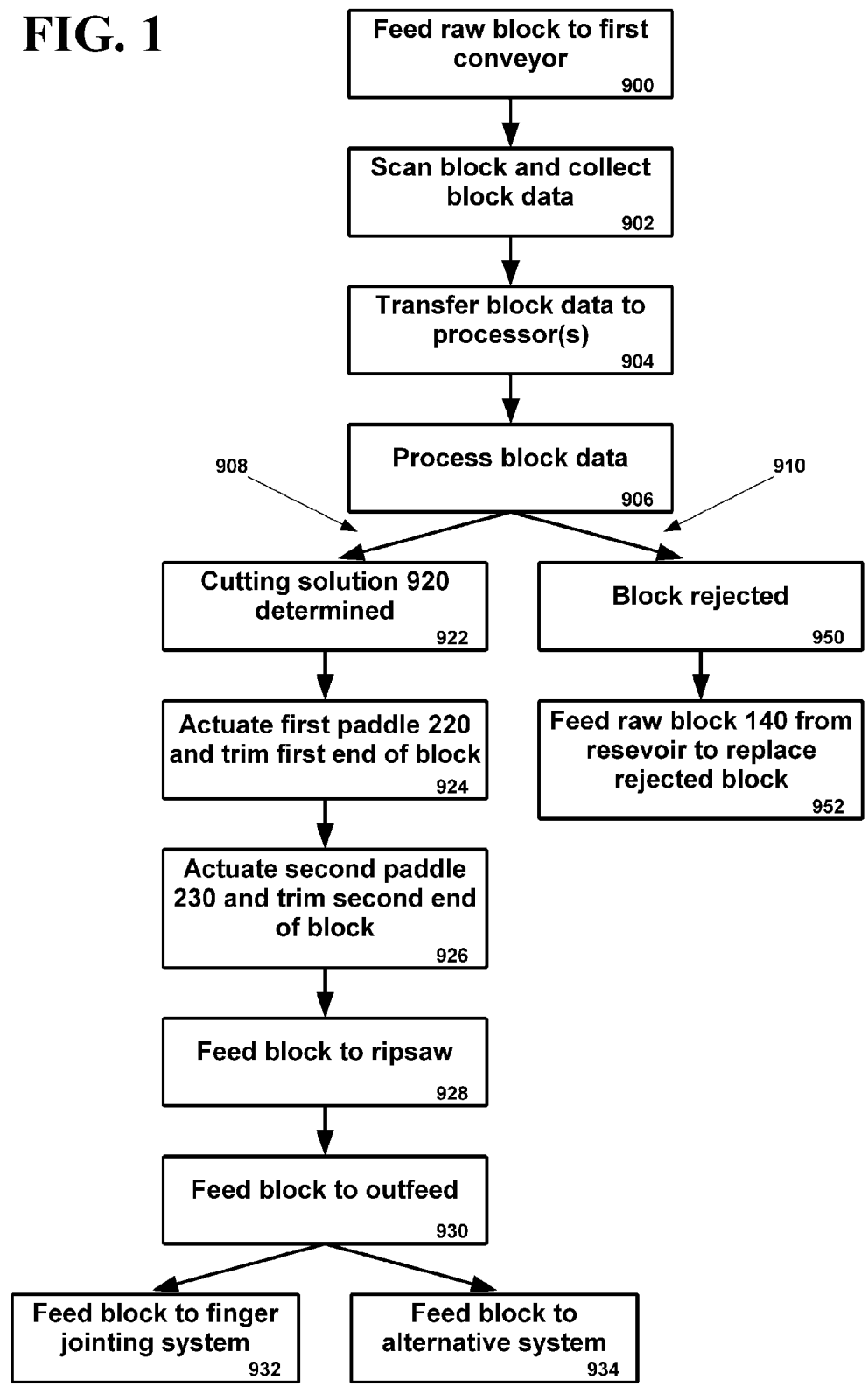
FIG. 1 is a flow diagram of a first embodiment.

In this disclosure the following terms have the following meanings which are presented by way of illustration and clarification only and are not limiting:

The term "chain" or "conveyor chain" is intended to mean an element of a conveyor and although in particular embodiments this may be a chain per se, in alternative embodiments it may be any other form of elongated band suitable to function as part of a conveyor structure, including without limitation a metal, rubber, plastic or other strip of any suitable material, physical properties and dimensions.

The term "continuous range" is intended to include its ordinary meaning and for greater clarity is intended to include the situation where within the limits prescribed by a particular range, a large number of preselected values separated by relatively small intervals may be selected within the limits of accuracy of the control system therefor. By way of further clarification "continuous range" is to be contrasted with a system which permits only a relatively limited number of possible positions or positions separated by relatively large increments. By way of illustration and not limitation, in particular embodiments the increments contemplated in a continuous range of wood block positions may be less than 10 inches, less than 9 inches, less than 8 inches, less than 7 inches, less than 6 inches, less than 5 inches, less than 4 inches, less than 3 inches, less than 2 inches, less than 1 inches, less than 0.9 inches, less than 0.8 inches, less than 0.7 inches, less than 0.6 inches, less than 0.5 inches, less than 0.4 inches, less than 0.3 inches, less than 0.2 inches, less than 0.1 cm or may be any other suitable value or range.

The term "conveyor" is intended to have its ordinary meaning and includes any mechanical apparatus that can be used to transport a wood block from one location to another. In particular embodiments the conveyors of the disclosure may comprise a wide range of materials including rubbers, plastics, and any other synthetic or natural materials all of which will be readily apparent to and selected from by those skilled in the art so as to best suit particular applications. In alternative embodiments conveyors may operate at various speeds which may be anywhere up to about 200 or more lugs per minute. Typically during operation runs the speed may be between 120 and 160 lugs per minute. The actual speed used may depend on the block dimensions and quality required in the run and suitable speeds for particular purposes will be readily identified by those skilled in the art.

The term "infeed" is intended to mean elements of a system or apparatus whose function is to introduce wood blocks to the system from an external supply, conversely an "outfeed" functions to deliver wood blocks processed by the system or apparatus to a destination which may be a hopper, a human operator, a stacking device or any other suitable receiving arrangement. In alternative embodiments infeeds and outfeeds of the invention may comprise hoppers, singulators, conveyors, stacking apparatus, manual handling or other components.

The term "gapper" is intended to mean a mechanism for controlling the movement of wood blocks and introducing suitable gaps therebetween, the gappers of the disclosure may function by restraining the movement of blocks from an infeed onto a conveyor in accordance with predetermined parameters.

The term "kicker" is intended to mean any actuator or device used to displace or in any way remove wood blocks desired to be removed from a conveyor or other location. In particular embodiments a kicker may function by striking the longitudinal ends of a block with sufficient impulsive force to expel the block from its position on a conveyor. A range of actuator types and kickers will be readily understood by and selected from by those skilled in the art.

The term "lug" is intended to mean a projection, protrusion, recess or other restraint, hold or support for blocks of wood on a conveyor, in particular embodiments a lug may be or comprise regions of conveyor surface with a sufficiently high friction to prevent sliding of wood blocks thereacross during regular operation of the conveyor.

The term "positioning paddle" or "paddle" is intended to mean any structure having a surface and suitable to position a wood block in any of the embodiments described herein. Without limitation, in particular embodiments, a paddle may be resilient or partly resilient, and may comprise a wide range of materials including rubbers, plastics, and any other suitable materials all of which will be readily apparent to and selected from by those skilled in the art.

The term "positioner" or "positioning unit" is intended to mean an assembly for moving and positioning paddles to thereby position blocks on a conveyor. Within the positioning unit, paddles may be disposed in paddle arrays and the positioner may be partly determined by suitable guides in fences.

The term "processor" is intended to mean an electronic or other device for accepting data input, performing mathematical and logical operations using the data to generate a result which may include determining a cutting solution, or the absence of an acceptable cutting solution, for a particular wood block. A processor may also control actuators to implement a cutting solution, reject or otherwise process a wood block. Without limitation, in particular embodiments, the processor may consist of a programmable logic controller (PLC), a proportional integral derivative controller (PID), a digital control system (DCS), a microcontroller, an application specific integrated circuit, or an industrial computer. In particular embodiments one, two, three or more processors may be provided separately or may be comprised in a single unit.

The term "resilience" is intended to mean the capacity of a material to absorb energy when it is deformed elastically and then, upon unloading to have this energy recovered. In other words, it is the maximum energy per volume that can be elastically stored. Resilience encompasses flexibility, elasticity and like terms and may be used interchangeably therewith herein, it being understood that any reference to flexibility, elasticity or the like shall be understood to be synonymous with and include resilience. The desirable or necessary Modulus of Resilience for specific applications, will be readily calculated by those skilled in the art using standard formulae.

The term "scanner" and "scanner unit" is intended to mean a unit for scanning wood blocks and may include one or more sensors and may include a conveyor. A scanner or scanner unit may include or may be connected to a processor. In particular embodiments the scanner may comprise a GRADEX™ scanner supplied by COMACT™.

The term "singulator" is intended to have its conventional meaning and may include a spinning disk used to position wood blocks in longitudinal orientation to direction of movement of the conveyor.

The term "solution" or "cutting solution" is intended to mean a calculated combination of cuts whose result will be to yield a processed wood block whose shape and dimensions satisfy particular predetermined requirements. In particular embodiments the shaped block may be suitable for finger jointing or for such other forms of subsequent processing as may be chosen.

The term "wood block" is intended to mean a block that may be between about 6 inches and about 30 inches long in particular embodiments. In an embodiment disclosed the blocks may be between about 8 inches and about 24 inches long. In alternative embodiments the blocks may be more than about 4, 5, 6, 7, 8, 9, 10, 11, 12 or more inches long and may be less than about 35, 34, 33, 32, 31, 30, 29, 28, 27, 26, 25, 24, 23, 22, 21, 20, 18, or fewer inches long. In particular embodiments the wood block may be between about 6 and 30 inches long, between about 8 and about 24 inches long, or between about 10 and about 20 inches long. Particular size ranges and selections will be readily determined by those skilled in the art to suit particular requirements. In alternative embodiments the width and diameter of a block may each independently be up to about 1, 2, 3, 4, 5, 6, 7, 8, 9, 10 or more inches. It will be appreciated that the examples and embodiments presented relate to the processing of wood blocks, but in particular alternatives the embodiments disclosed herein may be equally applicable to the cutting of blocks of other suitable materials such as plastics, metals, ceramics, meats and the like. Any necessary adjustments to suit different materials to be processed will be readily identified and implemented by those skilled in the art.

The embodiments of the invention are described with reference to the accompanying FIGS. 1 through 28 which are illustrative of particular embodiments and are not limiting. For clarity, not all structures are numbered in all drawings, and alternative illustrations may be numbered to draw attention to different features of an embodiment. Some illustrations may have been simplified for clarity of explanation.

First Embodiment

In a first embodiment generally designated 2 and described with reference to FIGS. 1 through 28 there is disclosed an apparatus for trimming a wood block 140. The apparatus may comprise a first conveyor generally designated 100 having a first direction of travel 102 that may comprise a series of substantially parallel conveyor chains 104 separated by spaces 106. The apparatus may further have an infeed generally designated 410 for delivering onto said first conveyor 100 a wood block 140 extending between first and second ends 142, 144. The apparatus may also comprise a scanner unit 130 for scanning the wood block 140 on the first conveyor 100 and comprising a first sensor 132 and a first processor, the first sensor 132 being operatively connected to the first processor for calculating a solution for wood block 140. The scanning may occur in a defined scanning zone 133. In alternative embodiments the first conveyor 100 may comprise one, two, three, four, five or more conveyor chains 104. Each conveyor chain 104 may have a width 110 and a surface 114 and together any two chains may define an open space 106 between adjacent surfaces 114. It will be seen that the spaces 106 may be substantially large compared to the width 110 of chains 104. The conveyor chains 104 may be narrow relative to said space 106 between the conveyor chains 104 so that sufficient scanning information can be derived for the processor to calculate the solution. In the embodiment illustrated the chains 104 of first conveyor 100 may bear pins 116 which may function as lugs to guide blocks 140 on the conveyor 100. The apparatus may also comprise a trimming unit 6 actuable by the first processor and may comprise a second conveyor 150 having first and second lateral edges 152, 154 and a second conveyor surface 156 and a second direction of travel 161; a wood block positioner 210 comprising a first paddle moveable transversely inwardly across said second conveyor surface 156; and a first trimsaw 20 for trimming said first end of said wood block 140. In alternative versions of the embodiment the trimming unit 6 may comprise a second paddle 230 and a second trimsaw 21 and said second paddle 230 may be actuable by said first processor to position said wood block 140 for said second trimsaw 21 to trim said second end 144. In some versions sufficient scanning information may be derived when said block 140 passes through said scanner unit 130 once. The apparatus may be comprised in a finger jointing system.

In the first embodiment as illustrated particularly in FIGS. 4, 6, 7, 9 the chains 104 may be bicycle chains and width 110 of chains 104 may be about 0.5 inches and the spaces 106 therebetween may be about 6 inches. In alternative embodiments the width 110 of individual ones of chains 104 may be about 0.2, 0.3, 0.4, 0.5, 0.6, 0.7, 0.8, or more inches and the spaces 106 therebetween may be about 1, 2, 3, 4, 5, 6, 7, 8, 9, 10, or more inches. The choice of particular dimensions and particular combinations of dimensions will be readily made by those skilled in the art to suit particular applications, block sizes and materials. In particular embodiments there may be one, two, three, four, five, six seven, eight, nine, ten or more conveyor chains in a conveyor. The dimensions of pins 116 may be chosen to minimise subsequent interference with scanning of the blocks 140.

Figure 10:
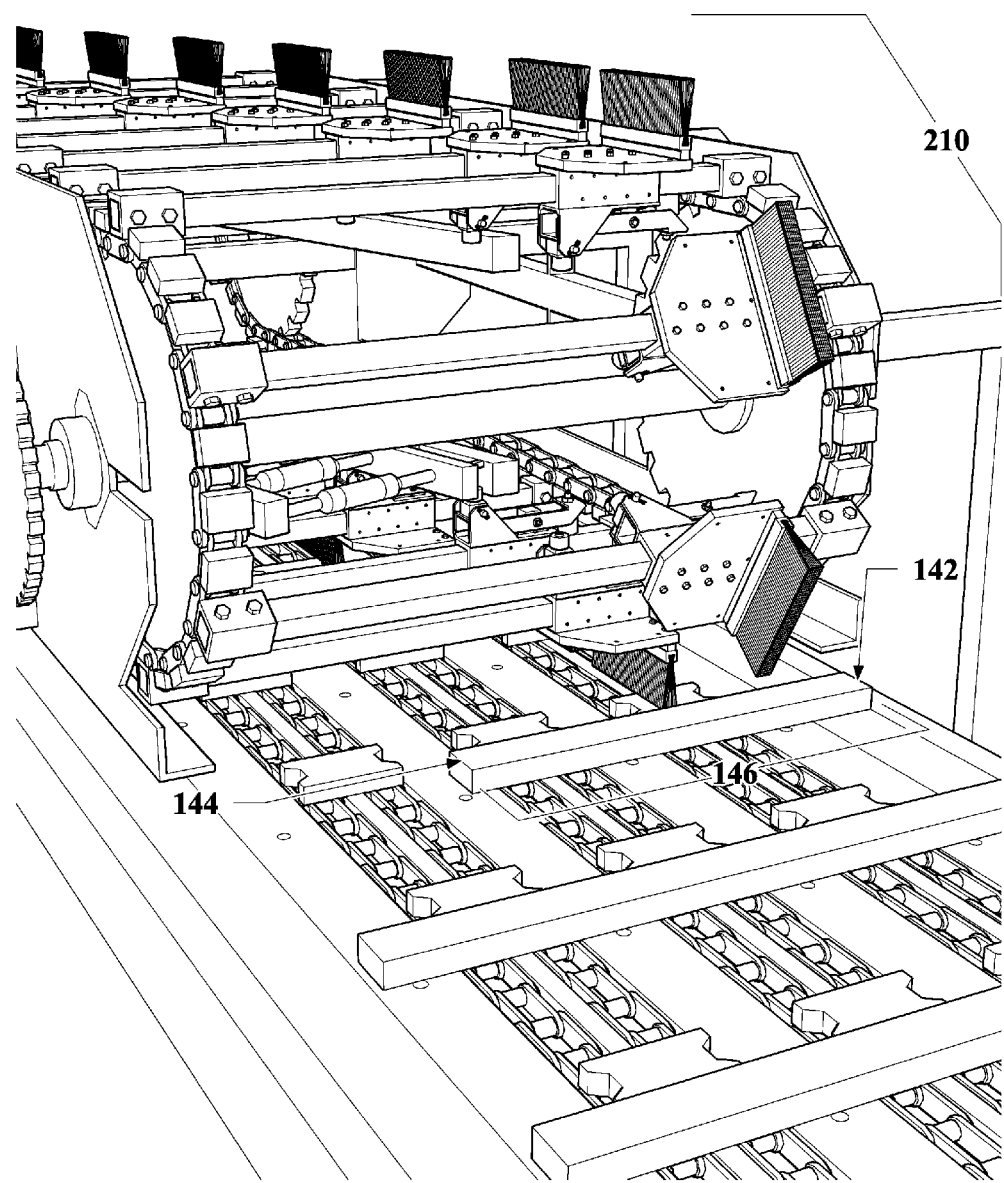
FIG. 10 is a perspective view of an infeed conveyor and overhead transfer.
Figure 11:
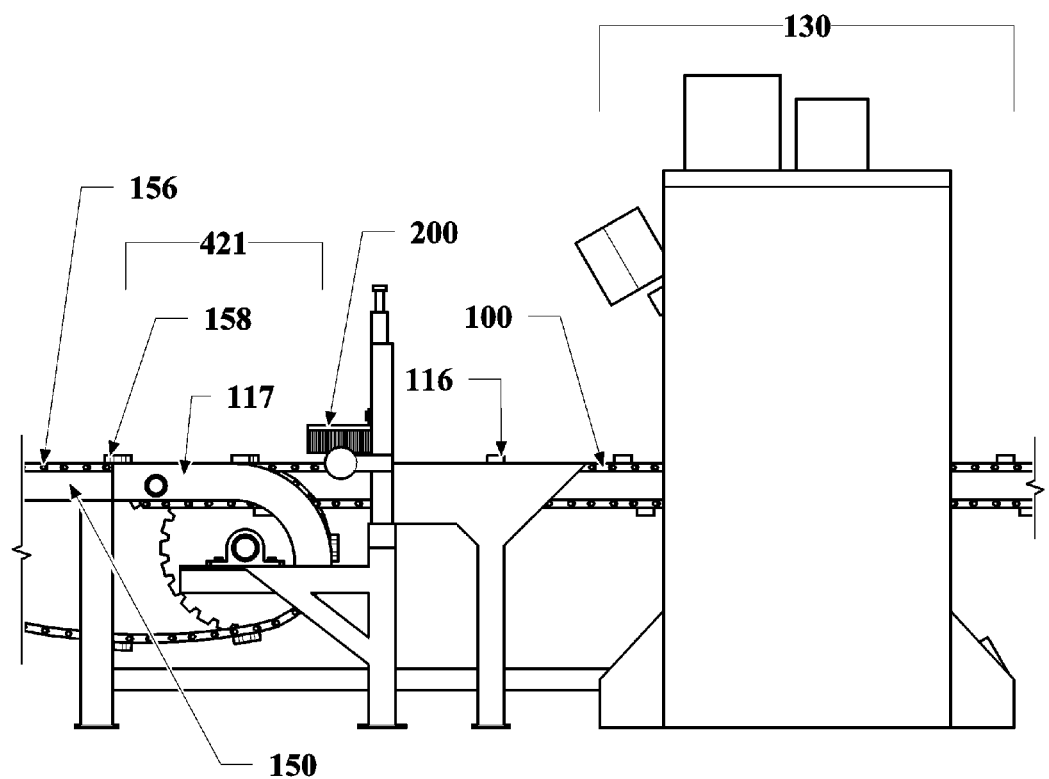
FIG. 11 is a side view of the transition between a first conveyor and a second conveyor of an embodiment.
Figure 12:
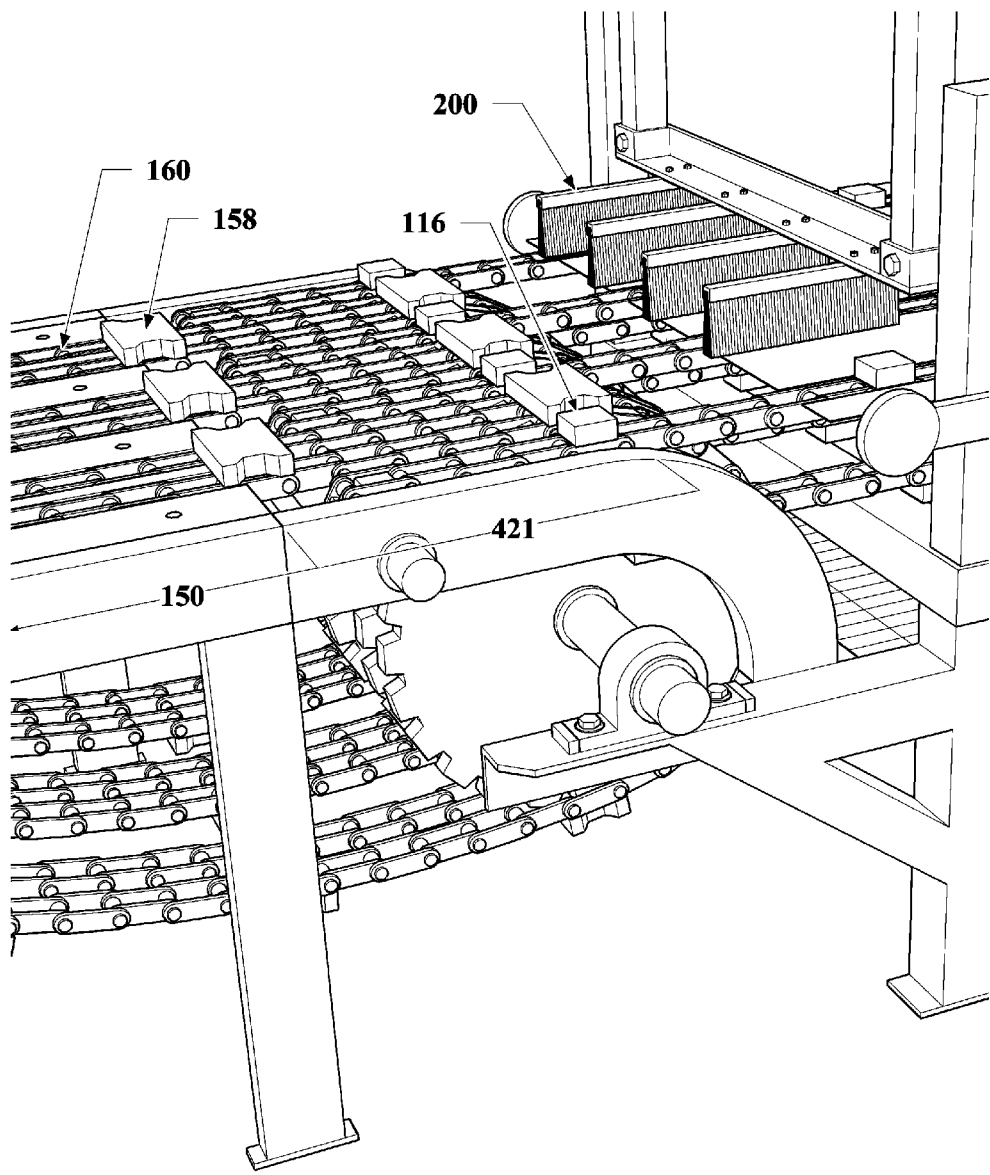
FIG. 12 is a perspective view of the transition between a first conveyor and a second conveyor of an embodiment.
Figure 13:
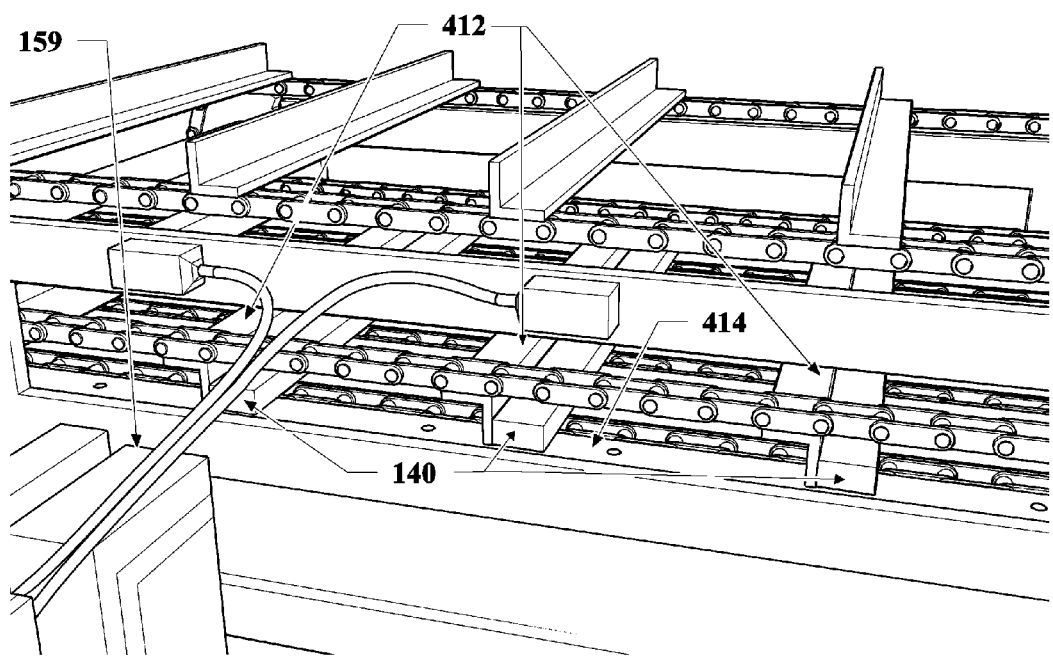
FIG. 13 is a perspective view of a part of a trimming unit of an embodiment.
Figure 14:
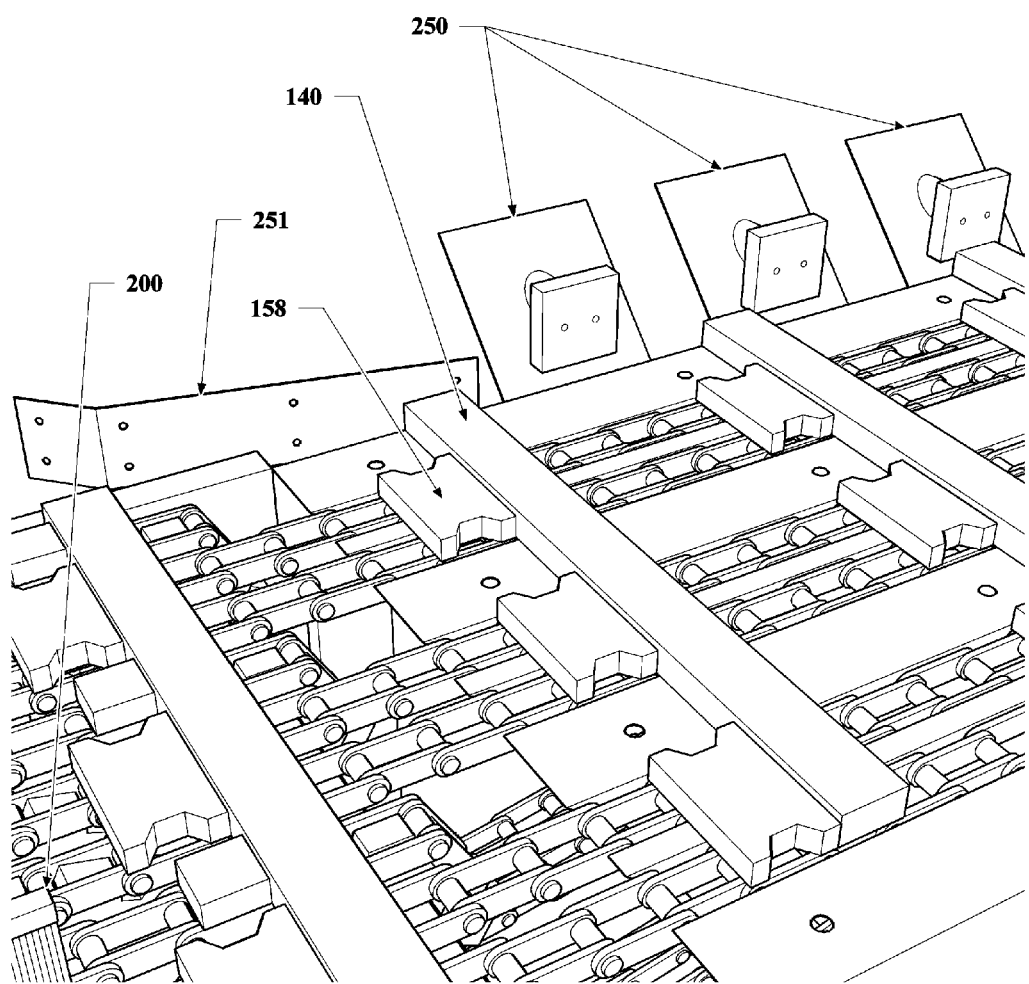
FIG. 14 is a view of kickers of an embodiment.
Figure 15:
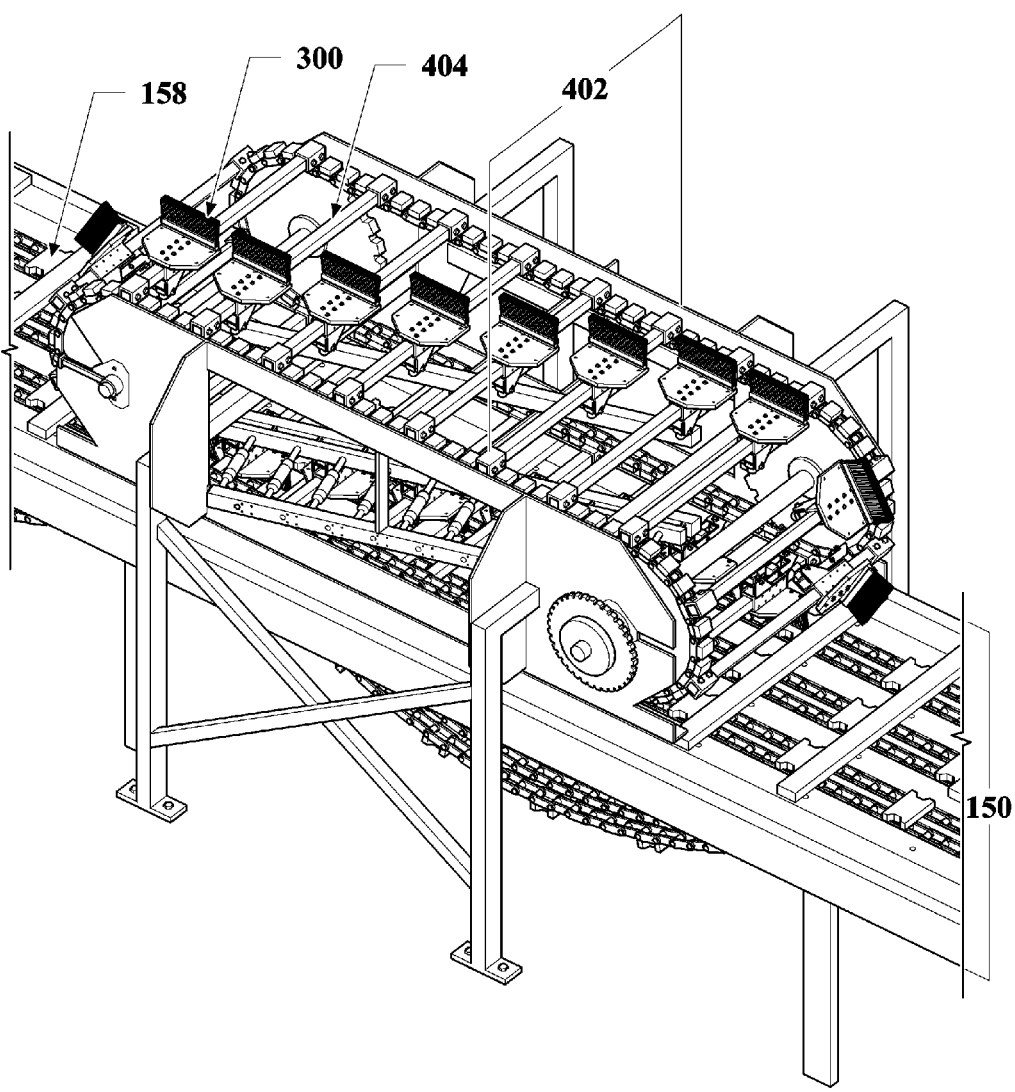
FIG. 15 is a perspective view of a part of a trimming unit of an embodiment.
Figure 16:
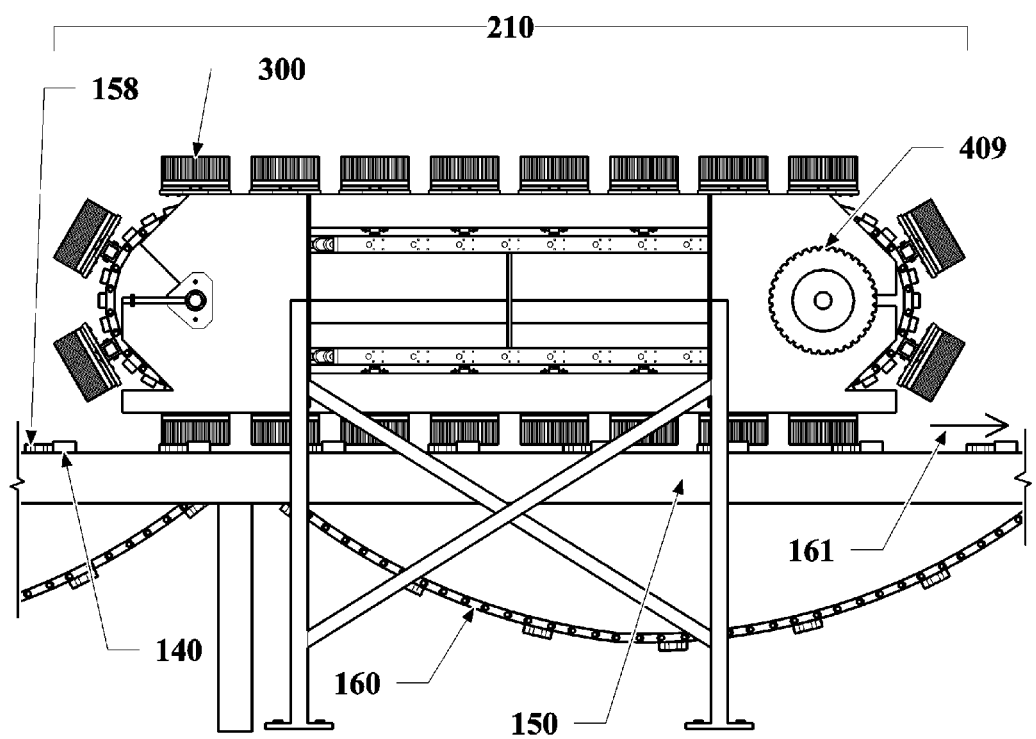
FIG. 16 is a side view of the trimming unit of FIG. 15.
Figure 17:
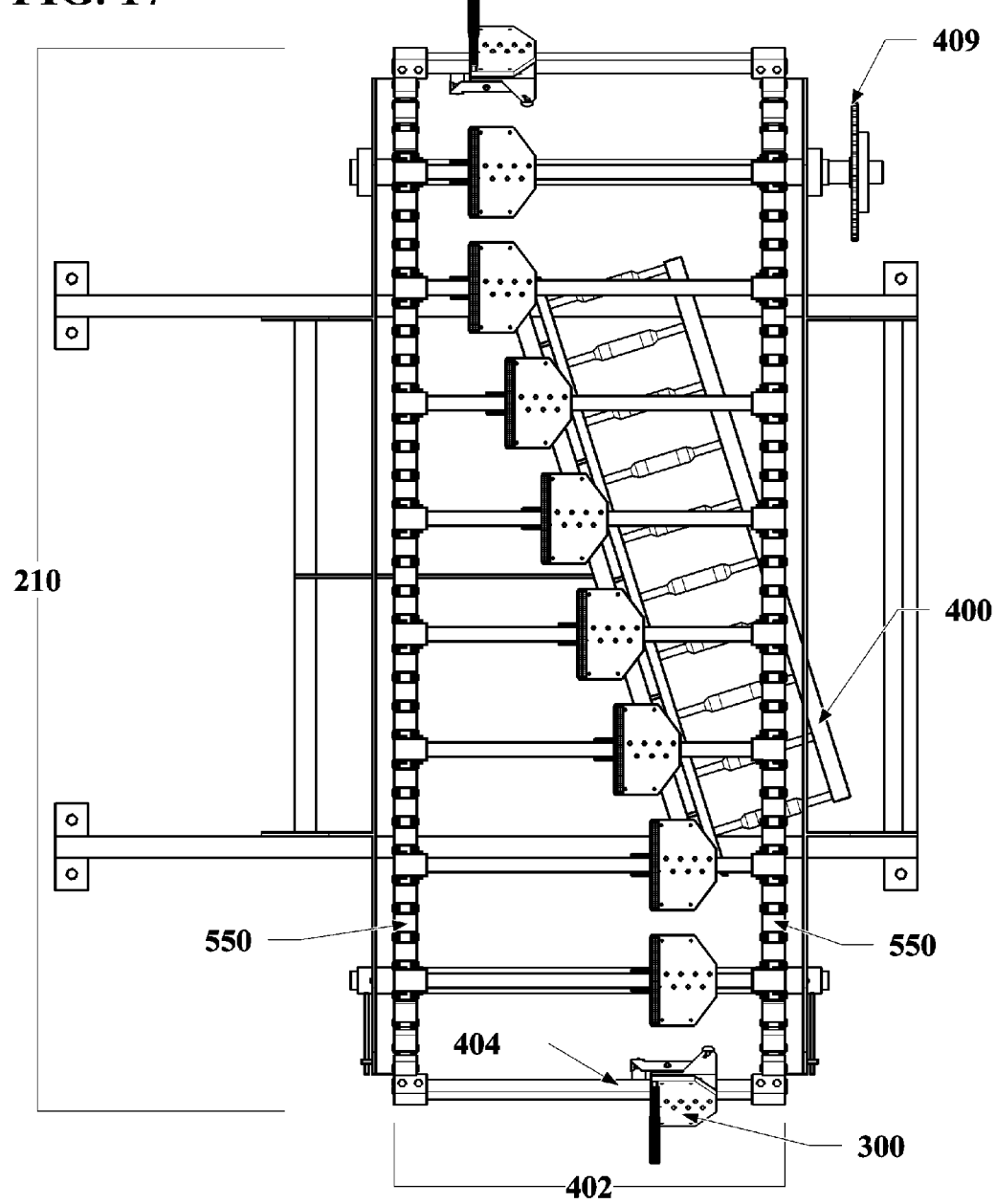
FIG. 17 is a plan view of an isolated, part of a trimming unit according to FIG. 15.
Figure 18:
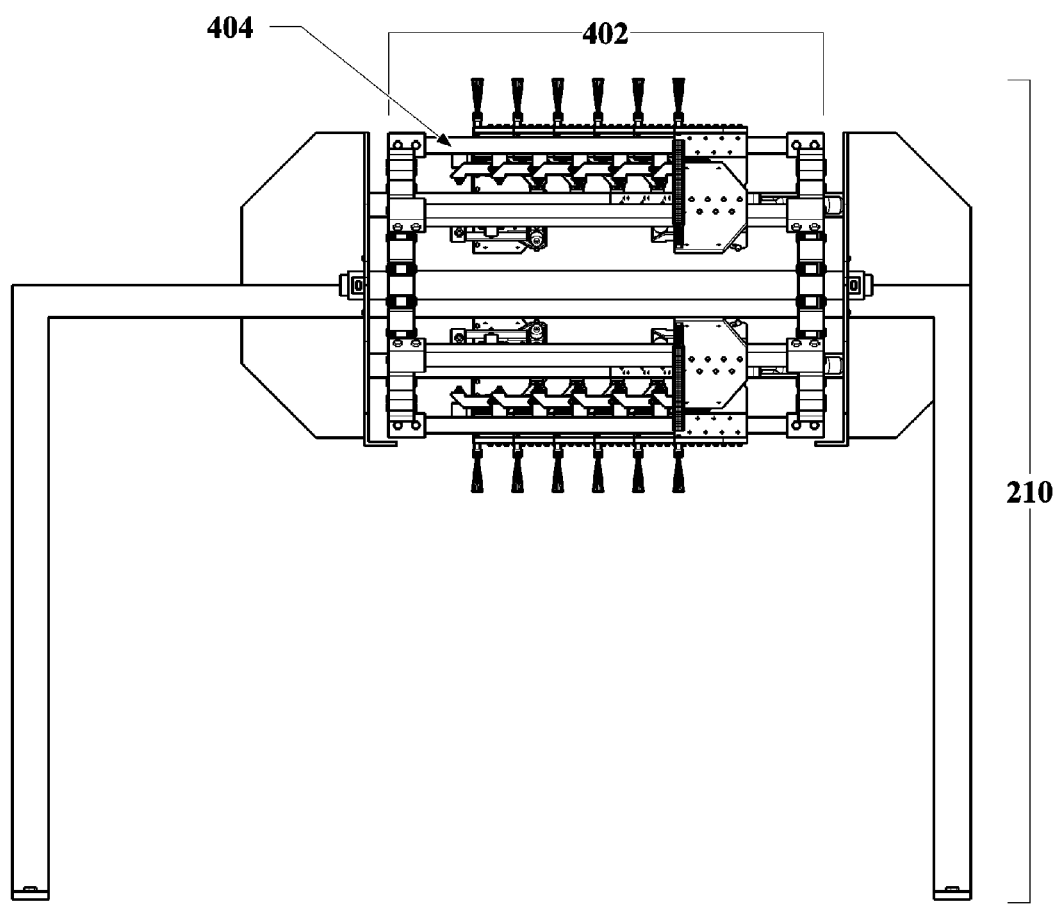
FIG. 18 is an end view of FIG. 17.
Figure 19:
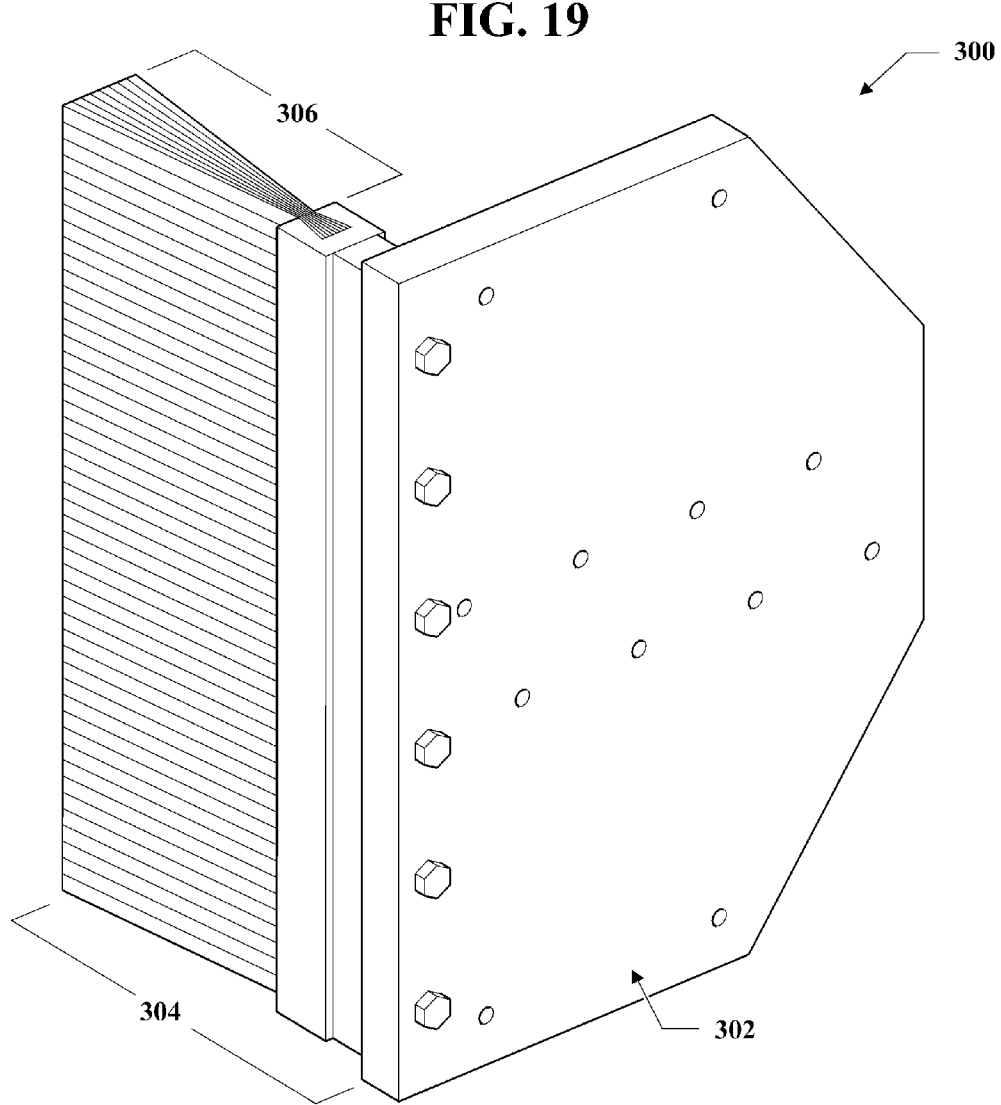
FIG. 19 is a first perspective view of a paddle of an embodiment.
Figure 27:
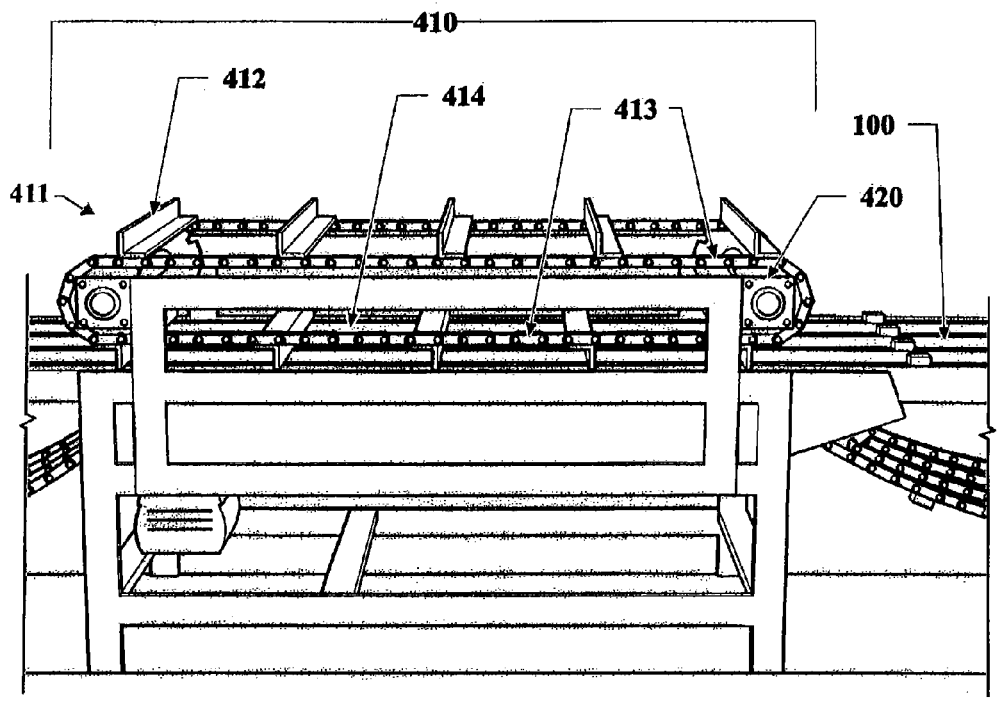
FIG. 27 is a side perspective view of an overhead transfer assembly of an infeed of FIG. 10.

The system may comprise an infeed generally designated 410 as shown in FIGS. 10 and 27, comprising an infeed conveyor 159. The infeed 410 may deliver onto the surface 120 of the first conveyor 100 transversely to the first direction of travel 102, a first wood block 140 that extends longitudinally between first end 142 and second end 144. In particular embodiments the infeed 410 may comprise an infeed conveyor 159 and may feed the wood blocks 140 longitudinally and may synchronise its delivery of blocks 140 with the first conveyor 100 so as to deposit individual wood blocks 140 into individual lugs 158 or individual defined positions on the first conveyor 100. A suitable gapper 16 may be provided to control the feed of wood blocks 140. The infeed 410 may be configured to eliminate some types of unsuitable starting material such as narrow slivers of wood by allowing them to fall off the edge of an infeed conveyor 159. Wood blocks 140 may be oriented and delivered to the infeed 410 manually or using a singulator 14 or a variety of other technologies and methods all of which will be readily apparent to those skilled in the art.

As shown in FIGS. 10 and 27 an infeed assembly generally designated 410 may comprise an overhead transfer 411 comprising lugs 412 mounted on cycling drive chains 413 driven by conventional gearing assemblies 420 and power means for moving wood blocks 140 across a surface 414 (which may itself be a conveyor) onto a first conveyor 100. An additional infeed conveyor 159 may feed wood blocks 140 onto the surface 414. A range of infeeds 410 for accepting wood blocks 140 and transferring them to first conveyor 100 may be possible or desirable in particular embodiments, all alternatives will be readily understood and implemented by those skilled in the art.

Figure 2:
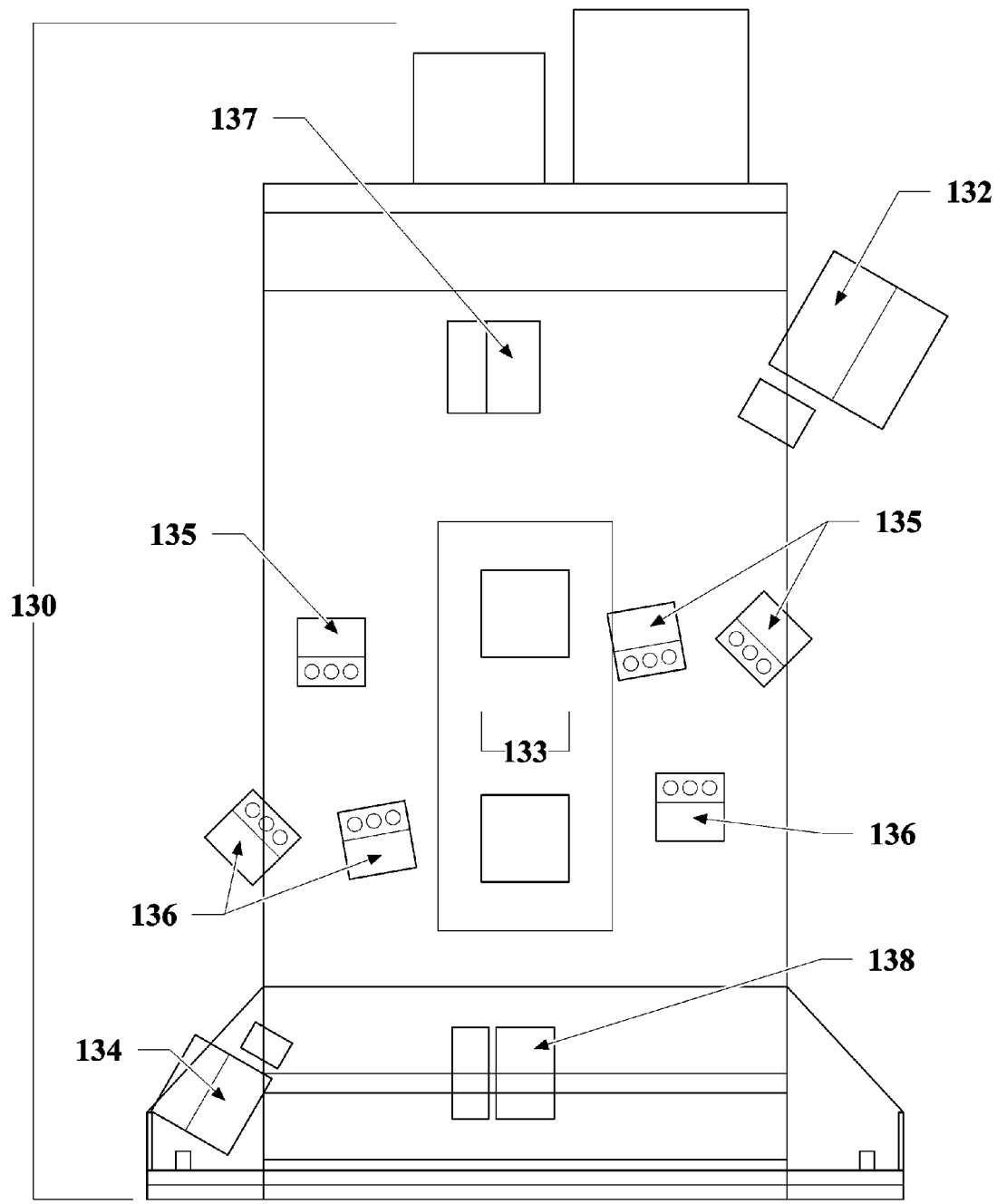
FIG. 2 is a side view of a scanner unit of an embodiment.
Figure 3:
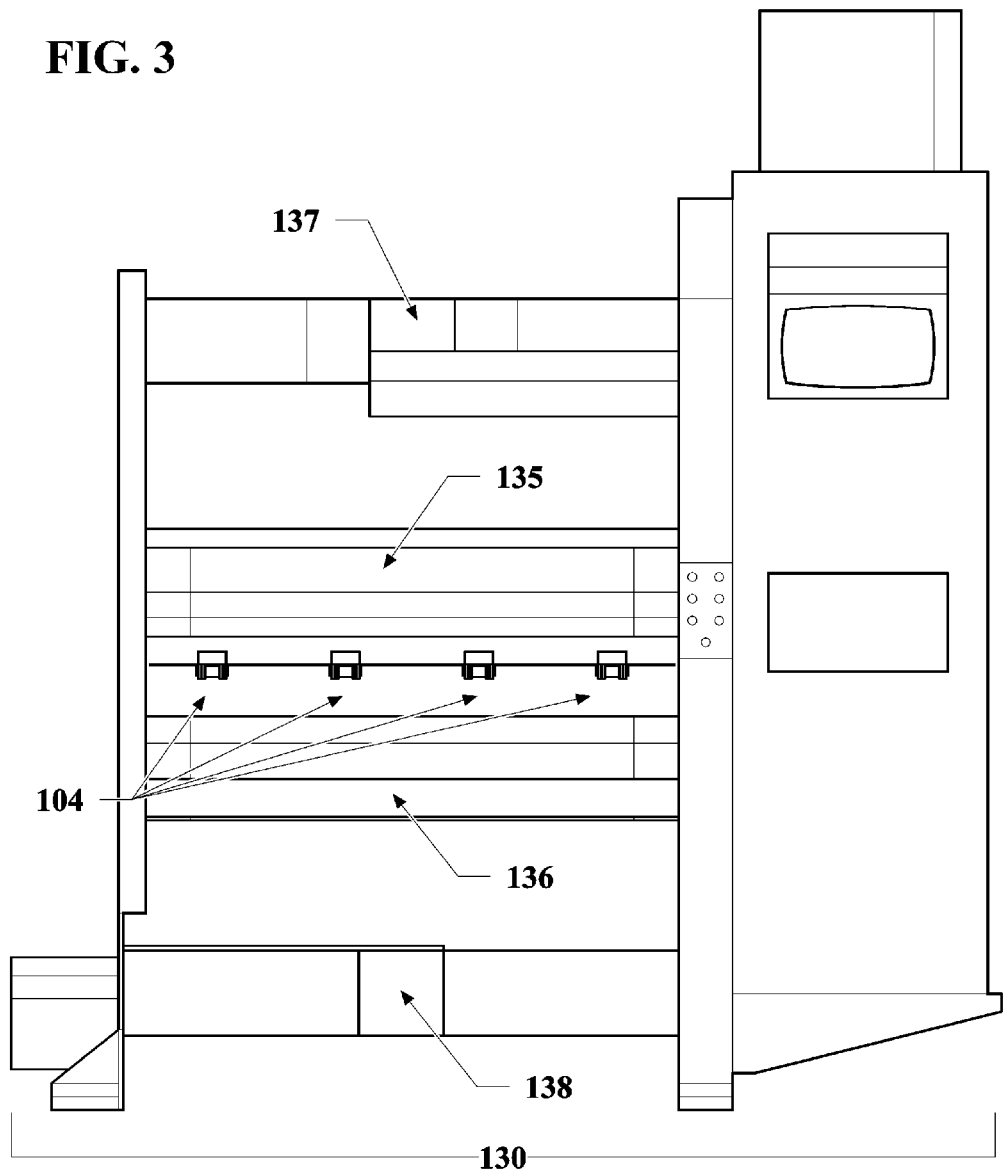
FIG. 3 is an end view of a scanner unit of an embodiment.
Figure 4:
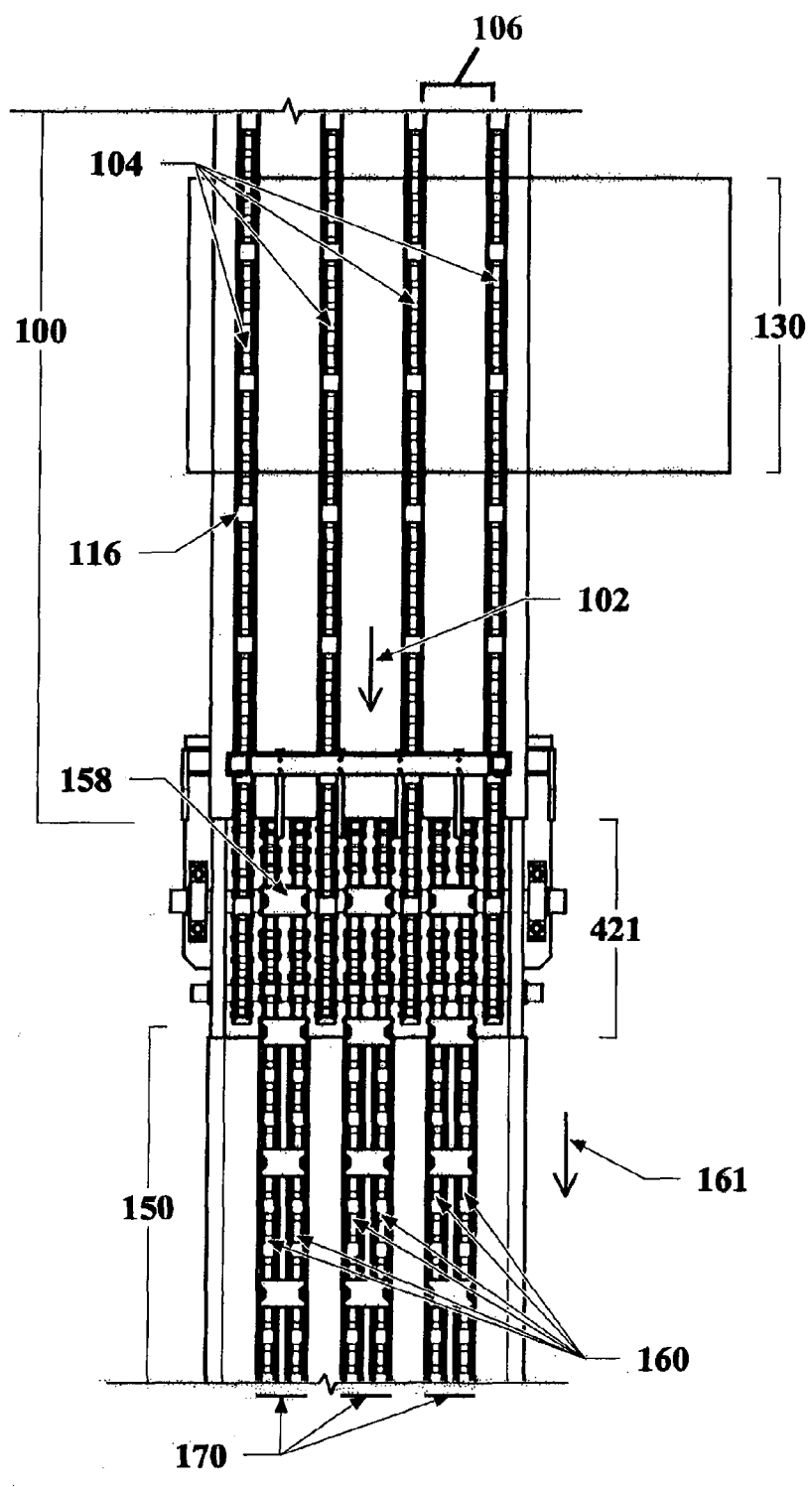
FIG. 4 is a top view of a first conveyor of an embodiment.
Figure 5:
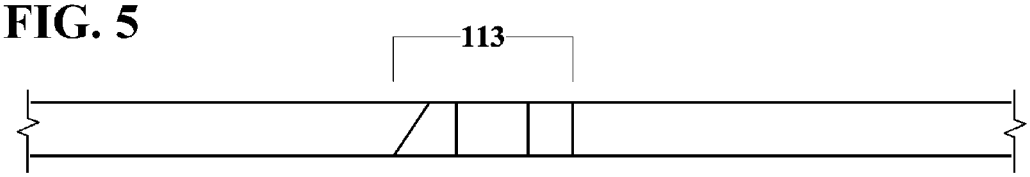
FIG. 5 is a side view of the conveyor of FIG. 4.
Figure 6:
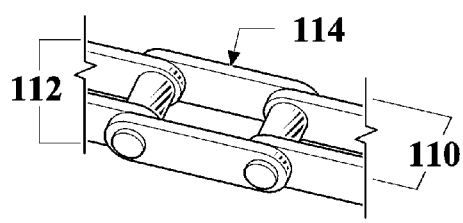
FIG. 6 is a perspective view of a conveyor chain of an embodiment.
Figure 7:
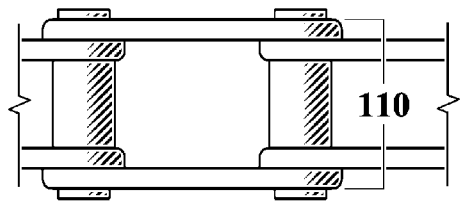
FIG. 7 is a plan view of a conveyor chain of an embodiment.
Figure 8:
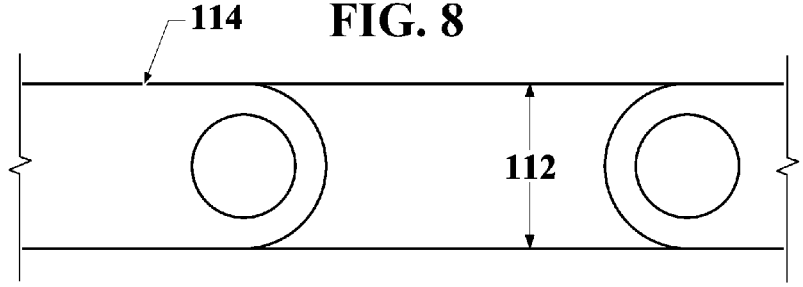
FIG. 8 is a side view of a conveyor chain of an embodiment.
Figure 9:
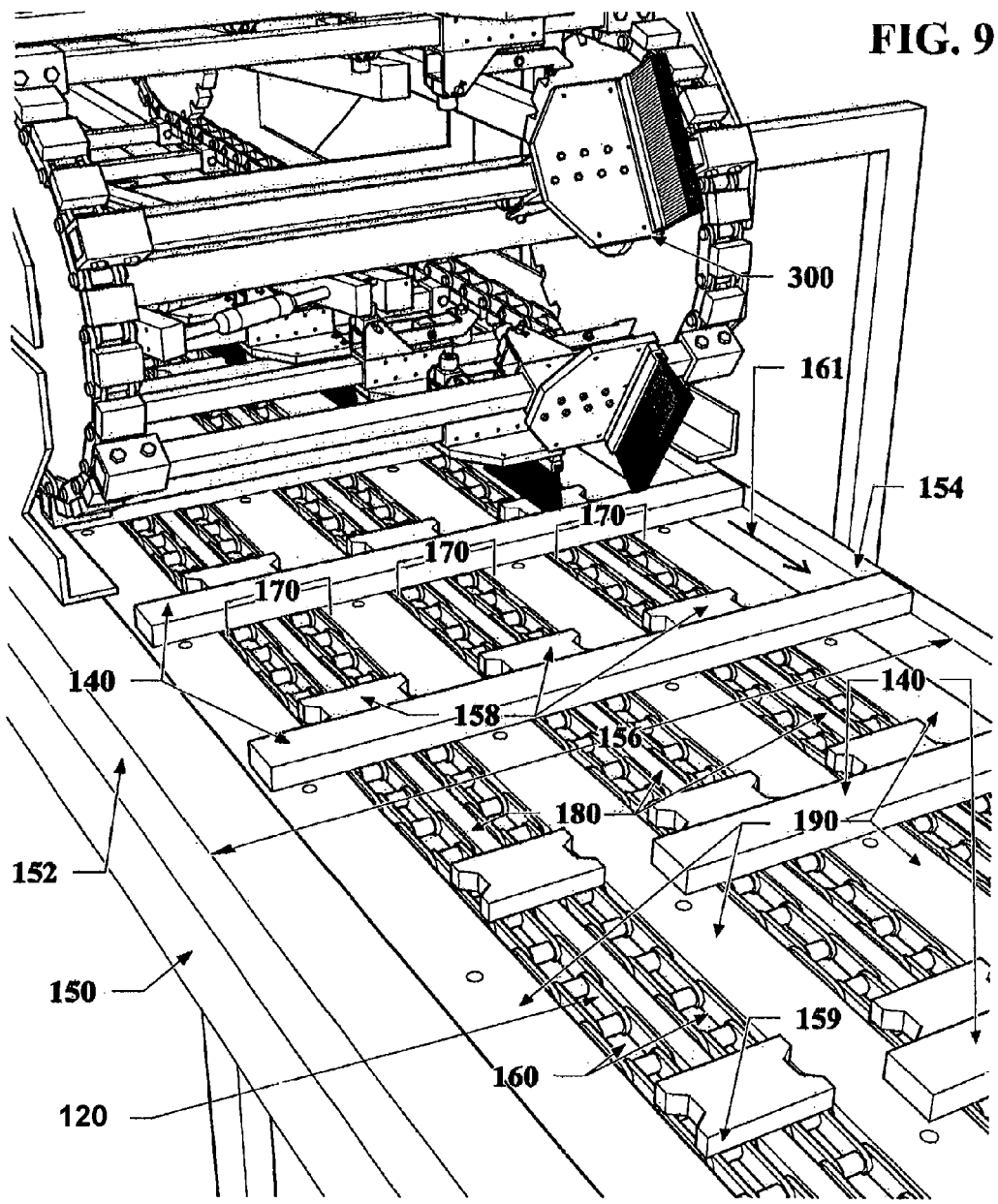
FIG. 9 is a perspective view of a second conveyor and trimming unit of an embodiment.

The system of the first embodiment may further comprise a scanner unit 130 as shown in FIGS. 2 and 3 for scanning the first wood block 140. This scanning may be conducted when the block 140 is on the first conveyor 100 and the scanner unit 130 may comprise one or more sensors 132, 134, one or more light sources 135, 136 a sensor and a first processor. In the embodiment illustrated there are provided a first sensor 132 and a second sensor 134, one or more light sources which may include lamps 135, 136 and may include lasers 137, 138. Lamps may be above (135) the conveyor or below (136) the conveyor. Lasers may likewise be positioned above (137) or below (138) the first conveyor 100. The lamps 135, 136 may comprise three phase lighting fixtures that may each comprise three lamps. The use of 3 phase lighting may ensure that 1 of the lamps is always on so that there is always an adequate level of illumination on the block 140 during scanning Individual lamps may be 32 watt Philips Universal High Vision lamps, Lamp Model # F32T8/TL835. The lasers 137, 138 used may be Dynavision scan head Model # M24B-14-24

The first sensor 132 is provided for scanning the first wood block 140 from above and the second sensor 134 may be for scanning the first wood block 140 from below. The sensor or sensors may be cameras. The cameras, processors, length measuring 'light curtain' and other associated apparatus, as well as specific algorithms comprised in a scanner and/or comprised in a processor may be comprised in a GRADEX™ model supplied by COMACT™. The first sensor and second sensor 132, 134 may be operatively connected to the first processor which is for calculating a cutting solution for the first wood block 140. In particular alternative embodiments one or more of the conveyor chains 104 may be narrow relative to the length 146 of the wood block 140 so that if a cutting solution is available that satisfies suitable predetermined parameters then scanning information from the sensors 132, 134 may be sufficient for the first processor to determine a cutting solution for the wood block 140 when the wood block 140 makes a single pass through the scanner unit 130. It will be understood that in alternative embodiments the system may comprise one, two, three, four, five, six or more of the first and second sensors 132, 134 and one, two, three or more first processors and one, two, three, four, five, six, seven, eight, nine, ten, eleven, twelve, thirteen, fourteen or more light sources. It will be appreciated that a wide range of combined numbers and positions of light sources, sensors, and processors will be readily apparent to and selected from by those skilled in the art. The specific positions of individual components illustrated will likewise be readily adjusted by those skilled in the art for specific applications. In the embodiment described the sensors 132, 134 are cameras, but alternatives will be readily apparent to and selected from by those skilled in the art. It will be understood that in alternative embodiments the cutting solution may be determined by a user to suit particular purposes.

In the first embodiment the system may further comprise a trimming unit 6 for trimming the scanned wood block 140 according to the cutting solution calculated by the first processor. The trimming unit 6 may comprise a scanner unit 130, and comprise a second conveyor 150 for accepting the wood block 140 from the first conveyor 100 in a transition zone 421 and having first and second lateral edges 152, 154 and a second conveyer surface 156 and a second direction of travel 161. In transition zone 421 chains 104 of first conveyor 100 interdigitate with chain pairs 170 of second conveyor 150 and as pins 116 of first conveyor 100 are withdrawn, replacement lugs 158 of second conveyor 150 come into position to continue to urge forward movement of a given wood block 140. The second conveyor 150 may be driven by a conventional gearing apparatus generally designated 117 which may drive movement of the second conveyor chains 160. As shown in FIGS. 9, 11, 12, 13, 14 the embodiment illustrated the second conveyor 150 comprises a plurality of lugs 158, each mounted across two substantially parallel conveyor chains 160 and aligned with corresponding lugs 158 on parallel and substantially synchronous pairs of conveyor chains each generally designated 170. Each of the individual chains 160 may be separated by a raised surface 180, 190. Raised support surfaces 180 are between individual chains 160 of any pair 170; wider raised surfaces 190 are between pairs 170. It will be understood that lugs 158 slide or move over surfaces 180 to guide wood blocks 140 thereon and that the raised surfaces 180, 190 may be made of a suitably strong and slippery material that weight of the blocks 140 may be borne thereby instead of by chains 160. It will be seen in the illustrated embodiment that a resistive member 200 which may be a brush 306, may be positioned over the surface 156 of conveyor 150 so that it drags on blocks 140 to ensure their engagement with lugs 158 and maintains them in suitable position for processing.

In particular embodiments the system may also comprise a wood block positioner (also referred to as a "positioning unit" or "positioner") generally designated 210 which may be comprised within a trimming unit 6 connected to and actuable by the first processor and may comprise a first paddle 220 and may comprise a second paddle 230, and the first and second paddles 220, 230 may be moveable along the second direction of travel 161 of the second conveyor 150 and may be moveable transversely inwardly across and above the second conveyor surface 156 from the edges 152, 154 of the second conveyor 150. For simplicity trimsaws are not shown in all illustrations of the trimming units, but possible positions are shown in FIG. 28. An individual example of a embodiment of a portion of a paddle assembly 299 comprising paddle 300 (which may be a first paddle assembly 220 or second paddle assembly 230) is shown in different views in FIGS. 19 through 25. A paddle 300 may comprise a supporting portion 302 and an end 304 of which a part, in this case brush 306, may be resilient and the paddle 300, attached to a paddle mount 301 may be mounted on a paddle mounting arm 404. In particular embodiments the system may also comprise a second paddle 230 that may be moveable to position the second end 144 of the first wood block 140 relative to a second calculated cutting line and may comprise a second trimsaw 21 for trimming the second end 144 of the first wood block 140. In alternative embodiments, first and second paddles may be combined in a single positioning unit or may be in separate positioning units. It will be understood that in alternative embodiments a variety of saw types may be used as a trimsaw and one, two, three or more trimsaws may be provided for particular alternative embodiments. In particular embodiments the first paddle 220 may be moveable to position the first end 142 of the first wood block 140 relative to a first calculated cutting line and the systems may comprise a first trimsaw 20 for trimming the first end 142 of the first wood block 140.

Figure 20:
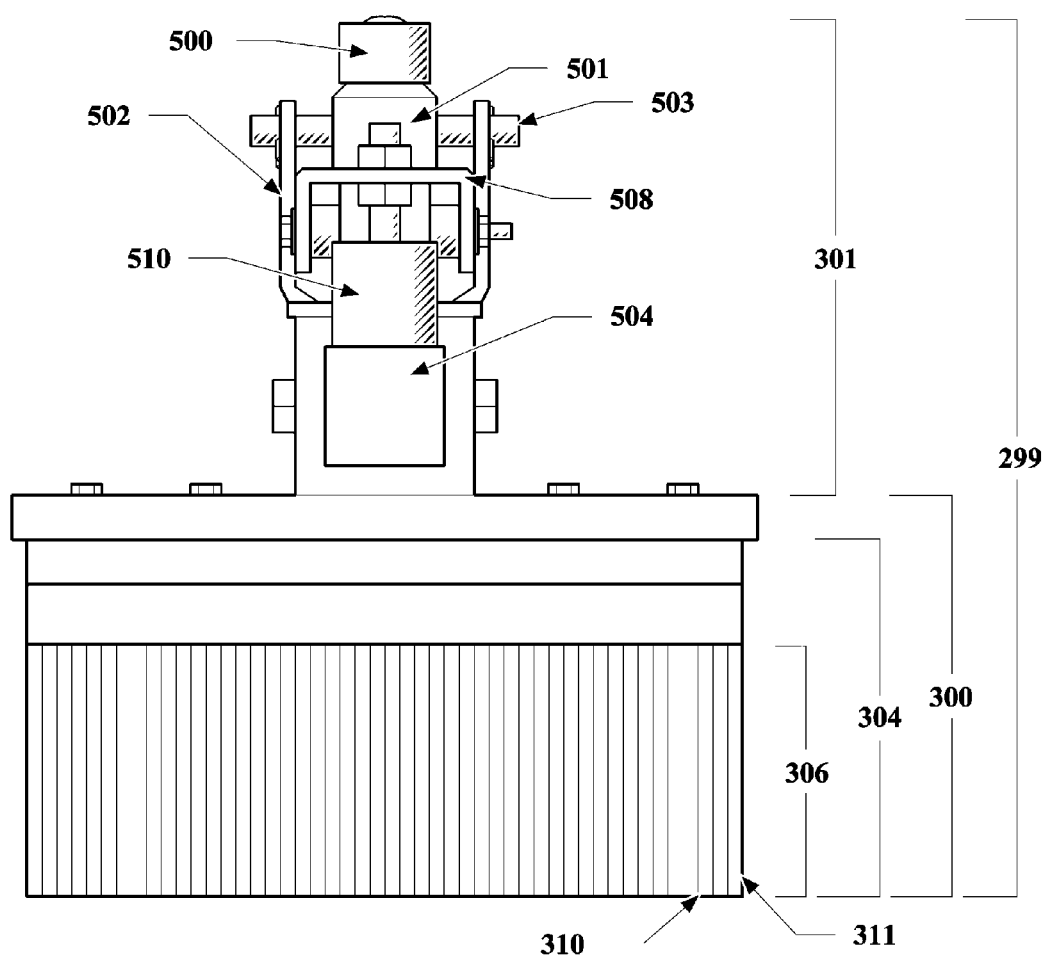
FIG. 20 is an end view of a paddle assembly of an embodiment.
Figure 21:
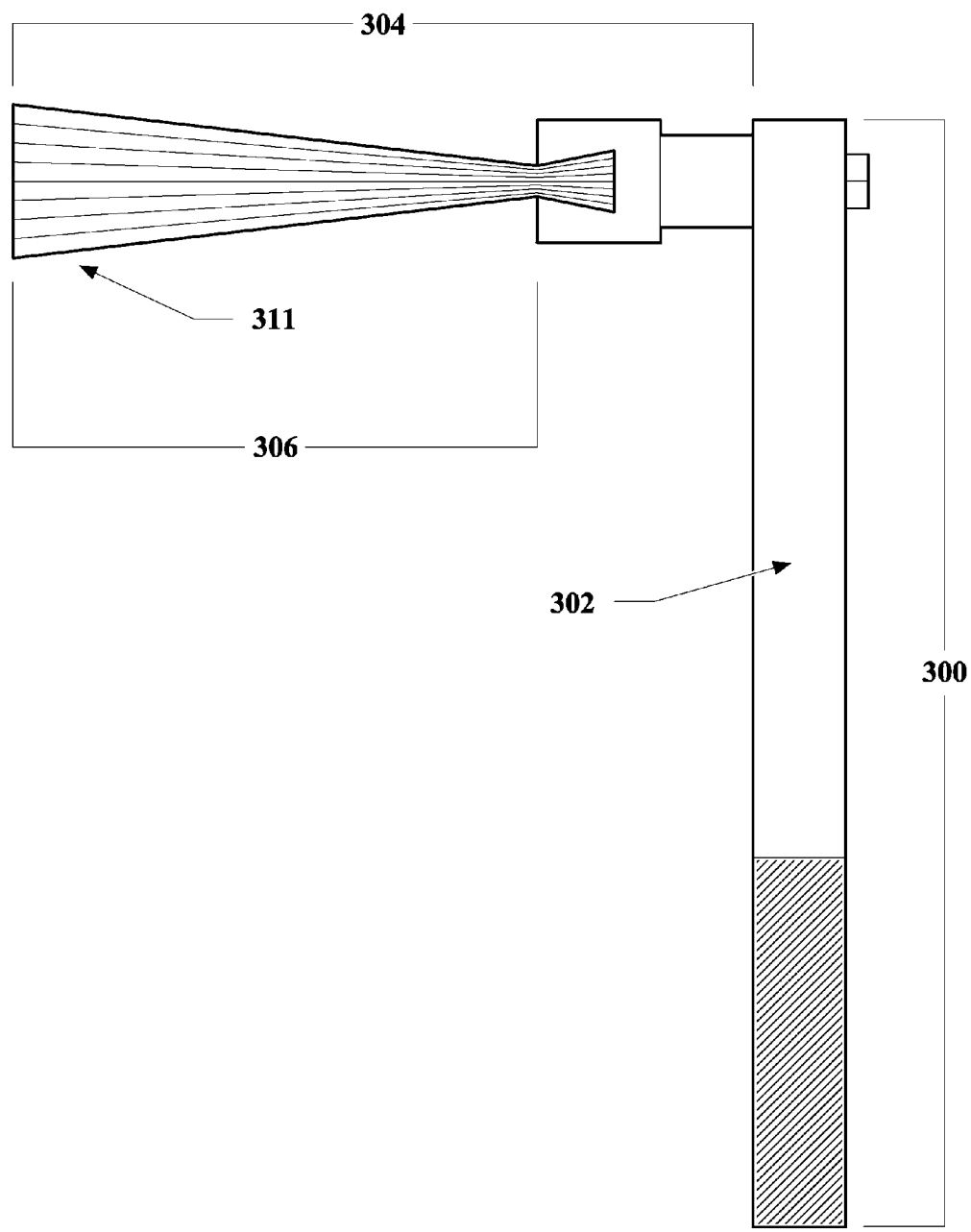
FIG. 21 is a side view of a paddle of an embodiment.
Figure 22:
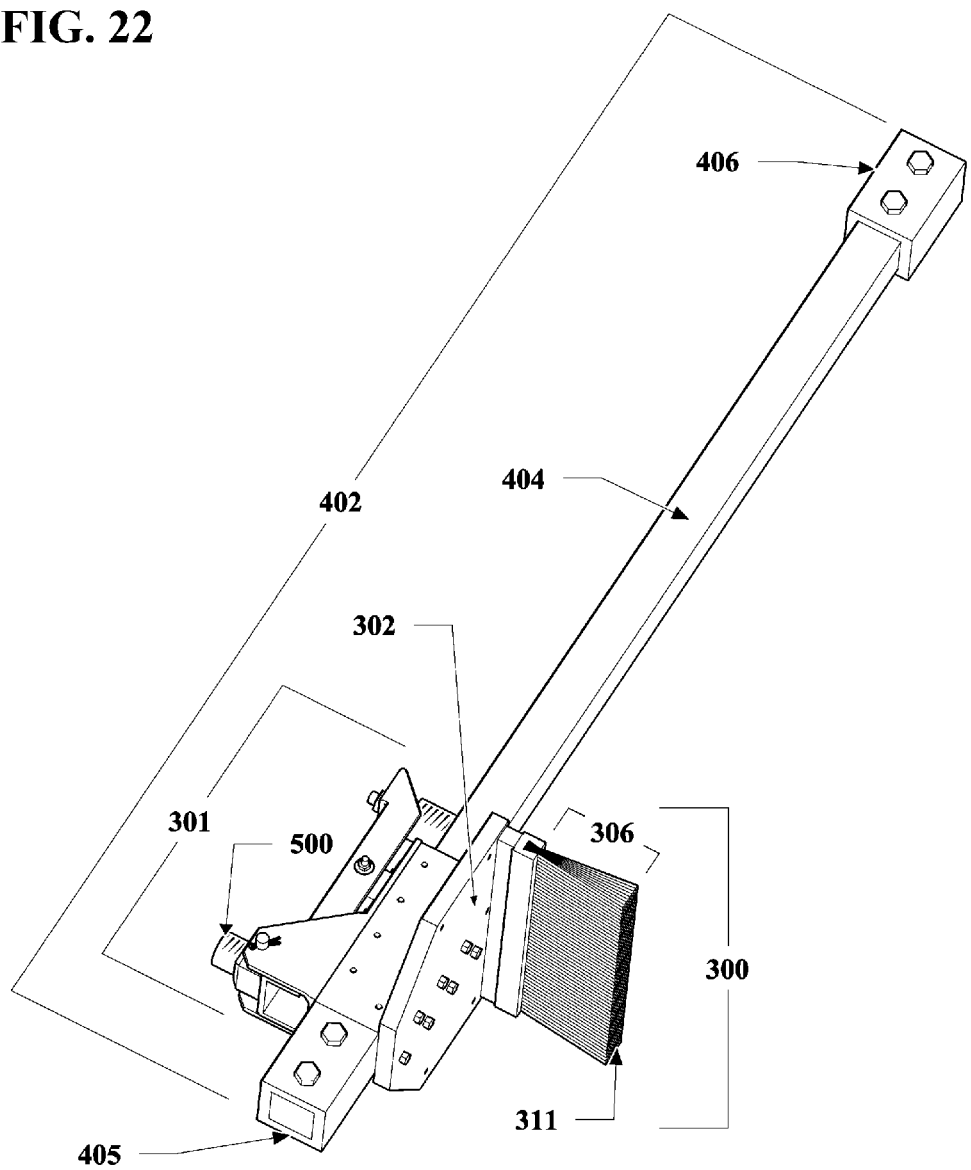
FIG. 22 is a perspective view of the paddle mounting arm and paddle assembly of an embodiment.
Figure 23:
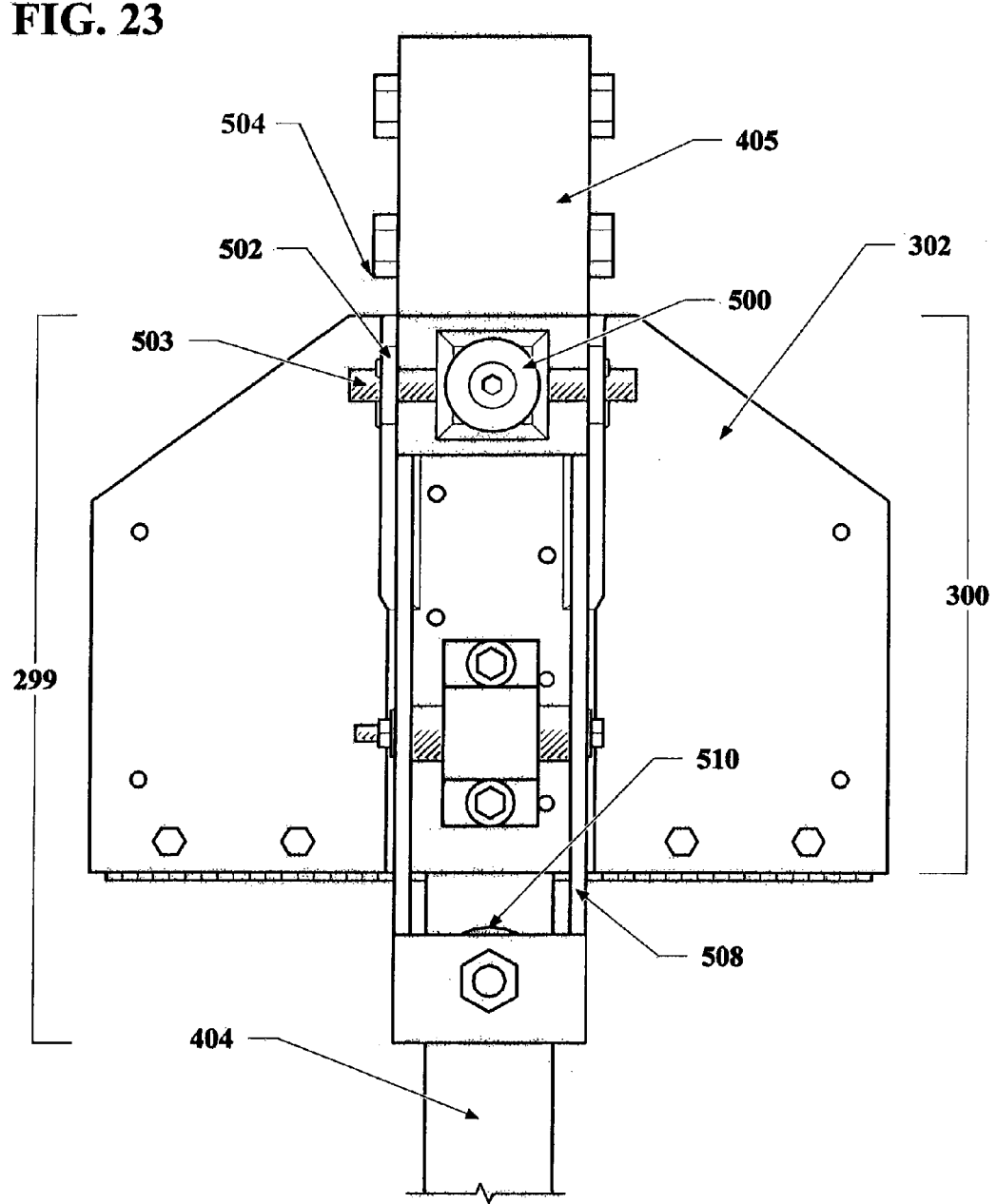
FIG. 23 is a top view of a part of the paddle mounting arm and paddle assembly of an embodiment.
Figure 24:
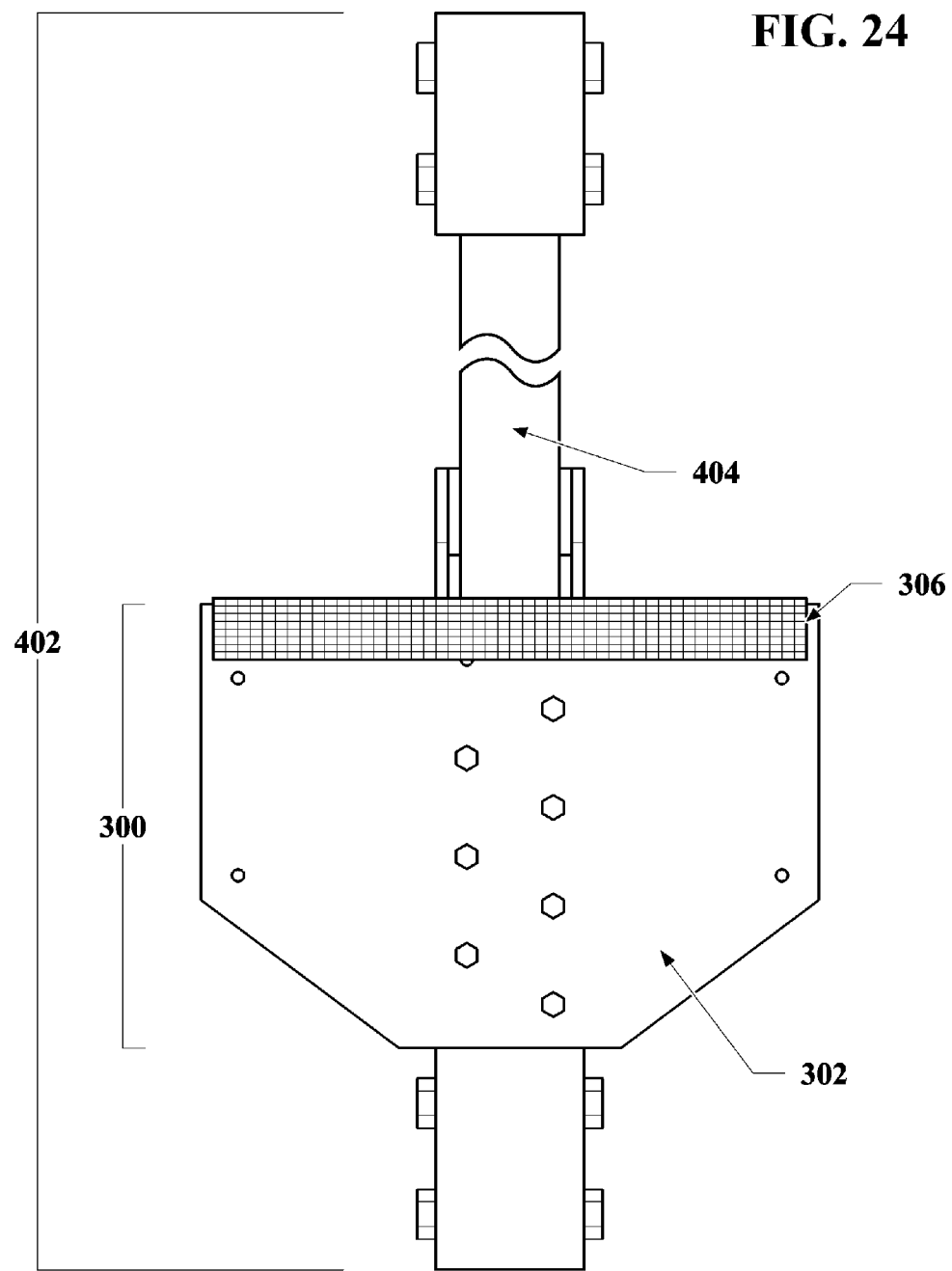
FIG. 24 is a bottom view of FIG. 23.
Figure 25:
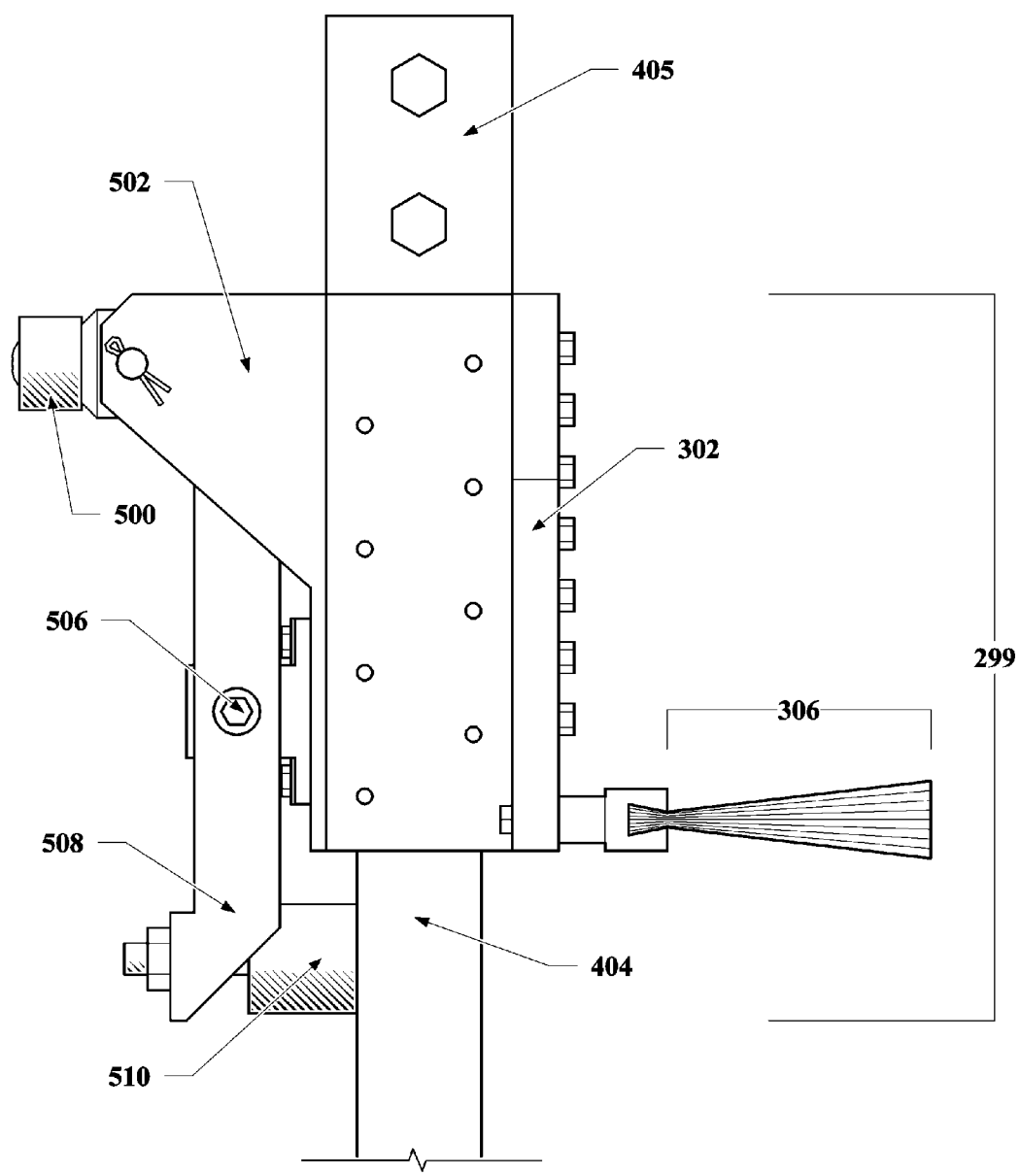
FIG. 25 is a side view of FIG. 23.
Figure 26:
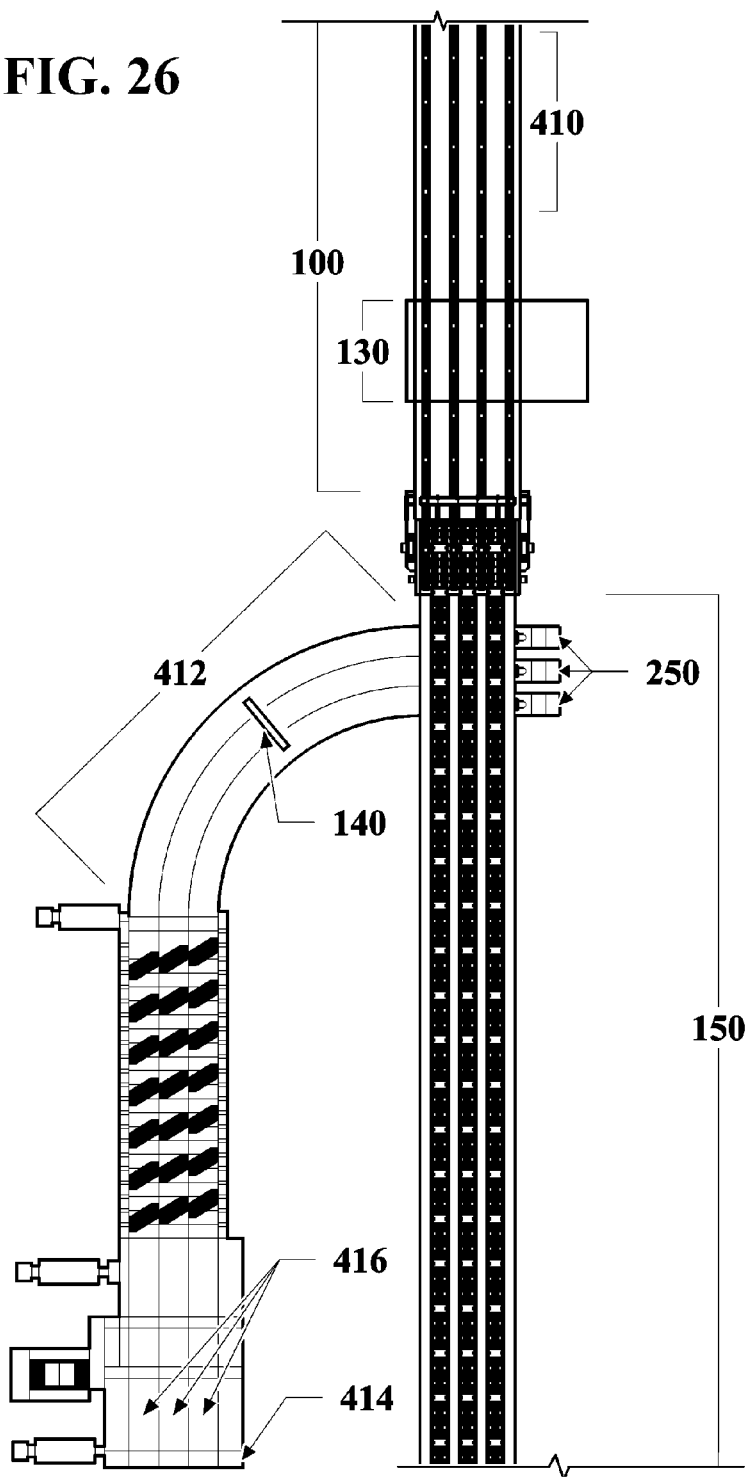
FIG. 26 is a plan view of a part of an embodiment showing the flow of rejected wood blocks to a ripsaw assembly.

As shown in FIGS. 20, 22 and 23 paddle assembly 299 may comprise paddle 300 and paddle mount 301 to which paddle 300 is attached. Paddle assemblies are slidingly mounted on arms 404, which cycle substantially in register with the movement of second conveyor 150. Paddle mounting arms 404 have associated mounting assemblies 405 to secure the ends of the mounting arms 404 to the drive chains 550 so that as the two drive chains cycle the paddle arms 404 are moved sequentially through a cycle. As will be seen drive chains 550 may be powered by a conventional gearing system generally designated 409 which is driven by a conventional power source. An individual paddle assembly 299 is slidingly mounted on arm 404 which passes through the body 502 of the mounting assembly 301 through an opening 504. The assembly 299 is slideable along arm 404 as guided by cam follower 500 so long as positioner brake 510 is in a non-restraining position relative to arm 404. It will be seen that cam follower 500 is mounted on a gimballed mounting 501 itself supported on an axle 503 extending through appropriate receiving holes provided in a housing 508. While the assembly 500 is slideable, positioner brake arm 508 rotatable about pivot 506 is held in a first non restraining position wherein the brake 510 does not contact arm 404. When block 140 reaches its predetermined position on conveyor 150 then cam follower 500 is disengaged from the positioning fence 400 and positioner brake arm 508 is allowed to rotate about pivot 506 so that brake 510 contacts arm 404 to frictionally restrain relative movement of assembly 299 along arm 404. Thus once disengaged from the paddle positioner fence 400, assembly 299 substantially retains its predetermined position and prevents lateral movement of block 140. Positioner brake 510 may be rubber or may be made from a range of other materials readily identified by those skilled in the art. Arms 404 with an associated paddle assembly 299 are mounted across drive chain loops 550 which are driven by a suitable power supply. It will be understood by those skilled in the art that suitable control systems may be provided to drive and coordinate the movement and speed of the various conveyors, paddle assemblies, and other components of the embodiments described. Those skilled in the art will readily understand a range of alternative ways to construct and implement the details of the paddle assembly 299 described and illustrated.

In an variant of the embodiment a plurality of first paddles 220 and a plurality of second paddles 230 may be provided and may be arranged sequentially in first and second paddle arrays. A second paddle array may be converted into a second paddle array by simply reversing the orientation of the combined arm 404 and assembly 299 so that the paddle assembly 299 is oriented and moves inward in the opposite orientation from those in the first paddle array. In alternative embodiments there may be provided any suitable number of first paddles 220 and there may be provided any suitable number of second paddles 230.

In particular variants of the embodiments as illustrated in FIG. 28 the system may also comprise an output ripsaw unit fed from the trimming unit 6. The output ripsaw unit comprising a ripsaw array 415 which may comprise one, two, three or more ripsaws, and a ripsaw feed 425 to feed the trimmed wood block 140 to the ripsaw 4 array 415. The ripsaw feed 425 may be positioned substantially at right angles to the second conveyor 150 so that trimmed blocks 140 can be directly moved onto the ripsaw feed 425. In particular embodiments the system may comprise a ripsaw outfeed 417 for a trimmed wood block 140 or for a trimmed and ripped wood block 140.

In particular variants of the embodiments the first processor may determine when there is no cutting solution that satisfies predetermined parameters for the first wood block 140 and the system may further comprise one or more kickers 250 actuable by the first processor to eject the first wood block 140 when the processor determines that there is no cutting solution that satisfies the predetermined parameters. One or more edge guides 251 may also be provided to assist in the initial positioning of blocks 140 on second conveyor 150. In alternative embodiments one, two, three or more kickers 250 may transfer wood blocks 140 designated by the first processor, to a second ripsaw feed 425. Feed 425 may move the blocks 140 to be thus processed, through a second ripsaw array 415 comprising one or more second ripsaws 416', 416", 416'". The ripped blocks 140 may then be further processed In particular variant embodiments the first wood block 140 may have an associated location on one of the conveyors 100, 150 and the system may further comprise a reservoir for holding a second wood block extending longitudinally between first and second ends and for which the acceptable cutting solution is calculable by the processor. In embodiments the system may comprise a second processor for tracking the location associated with the first wood block 140; and a second infeed operably connected to and actuable by the second processor for delivering the second wood block into the location transversely to the second direction of travel if the first wood block 140 has been ejected. In particular embodiments the location may be defined by a lug 158.

In particular variant embodiments the system may further comprise: a third sensor and a third processor suitably positioned and operatively connected to identify vacant locations, which may be empty lugs 158, on the surface one of the conveyors; a reservoir 22 for holding the second wood block extending longitudinally between first and second ends and for which the acceptable cutting solution is calculable; and a second infeed 24 for transversely delivering the second wood block into the vacant location, the second infeed 24 being actuable by the second processor to deliver the second wood block to fill the vacant location on the surface of one of the conveyors 100, 150.

In particular variants embodiments a paddle assembly 299 may have an end part, the end part may be resilient and may comprise a brush 306. In particular embodiments the brush 306 may have bristles 311 and the bristles 311 may be about 0.06 (sixty one thousandths) of an inch in diameter. In particular alternative embodiments the diameter of the individual bristles 311 may be between about 0.1 and 0.001 inches, between about 0.01 and 0.1 inches, between about 0.02 and 0.1 inches, between about 0.03 and 0.1 inches, between about 0.5 and 0.1 inches, between about 0.01 and 0.02 inches, 0.02 and 0.03, 0.03 and 0.04, 0.04 and 0.05, 0.05 and 0.06, 0.06 and 0.07, 0.07 and 0.08, 0.08 and 0.09, 0.09 and 0.1, 0.1 and 0.2, 0.2 and 0.3, 0.3 and 0.4 inches or may be more than about 0.02, 0.04, 0.06, 0.08, 0.1, 0.2, 0.3, 0.4 or more inches or may be in any other suitable range. In a first embodiment the bristles 311 may be supplied by AMERICAN BRUSH™.

It will be understood that although some embodiments of a paddle assembly 299 may comprise a brush 306 and bristles 311, in alternative embodiments of the paddle assembly 299 the end 304 may have a unitary surface or other design. It will be apparent that the precise degree of resilience (which term is used herein to include flexibility) necessary or desirable for particular uses will be readily determined by those skilled in the art to best suit the properties of the particular wood blocks 140, the properties of the conveyors 100, 150 and the desired parameters of the system.

In particular variant embodiments individual ones of the conveyor chains 104, 160 may be less than about 1 inch wide, and in alternatives the first conveyor chains 104 may be less than about 0.9 inches, less than about 0.8 inches, less than about 0.7 inches, less than about 0.6 inches, less than about 0.5 inches, less than about 0.4 inches, less than about 3 inches, less than about 2 inches, or less than about 1.5 inches. In particular embodiments individual ones of the conveyor chains 104, 160 may be about 0.5 inches wide. In particular embodiments the conveyor chains 104, 160 may be bicycle chains and there may be one, two, three, four, five, six, seven, eight, nine, ten or more conveyor chains 104, 160. The spacing of the conveyor chains 104, 160 will be readily adjusted by those skilled in the art to suit the particular dimensions of the blocks to be processed and to be compatible with the width of the conveyor chains 104, 160 and the particular requirements of the user. Those skilled in the art will be readily able to adjust the configuration and dimensions of the conveyor chains 104, 160 to permit the scanner unit 130 to scan the wood blocks 140 in sufficient detail to allow the calculation of a cutting solution for the block 140 or the determination that no acceptable cutting solution is available for the wood block 140.

In particular alternative embodiments the first paddles 220, or the second paddles 230 or the first and second paddles may be mounted along a paddle positioning fence 400 on mounting arm 404 and with the paddle assembly 299 mounted thereon on a cam mount. Paddle assembly 299 and arm 404 are together collectively denoted 402. In particular embodiments a paddle positioning fence 400 may be oriented along a line converging with the second direction of travel 161 of the second conveyor 150. In particular embodiments the line of the first paddle positioning fence 400 may converge with the second direction of travel 161 of the second conveyor 150 at an angle and the angle may be between about 10 degrees and about 20 degrees. In particular alternative embodiments the angle of convergence may be about 5, 6, 7, 8, 9, 10, 11, 12, 13, 14, 15, 16, 17, 18, 19, 20, 21, 22, 23, 24, 25 or more degrees. In further alternative embodiments the angle may be between about 5 and 10 degrees, between about 10 and 15 degrees, between about 10 and 20 degrees, between about 15 and about 20 degrees, between about 20 and about 25 degrees or may be greater than about 10 degrees or may be less than about 20 degrees.

As shown in the illustrations in a paddle array 422 the mounted paddle assemblies 299 may be on a continuous loop which brings the paddles down into register with the conveyor 100, 150, moves them along synchronously with locations thereon, and then after the wood block 140 has reached its predetermined position the paddle may be withdrawn and returned to the start of the array. The implementation of this system and its design will be readily understood and put into practice by those skilled in the art.

As explained with reference to the first embodiment any given paddle assembly 299 may have an end part and the end part 304 may be resilient, and the paddle 300 may be a brush 306 and the bristles 311 of the brush 306 may have a range of defined thicknesses as further disclosed herein. In particular embodiments one of the first and second conveyors 100, 150 may comprise a lug 158 having a lug surface 157 for preventing an individual one of the wood blocks 140 from sliding backwards relative to the direction of movement of the conveyor 102, 161; a resistive member 200 may be mounted above at least one of the first conveyor surface 120 and the second conveyor surface 156 for urging the wood block 140 against the lug surface 157; and the resistive member 200 may be resilient. In particular embodiments the resistive member 200 may be a brush 306 as described with reference to other embodiments and as the degree of resilience of the brush 306 may have a range of values as described for the paddle 300. In particular embodiments one of the first and second conveyors 100, 150 may further comprise a plurality of lugs 158. In particular embodiments the infeed 410 may comprise a third conveyor 171 substantially at right angles to the first conveyor 100 for delivering the wood block 140 onto the first conveyor surface 120 transversely to the first direction of travel of the first conveyor 102.

In an embodiment, trimmed blocks 140 may be passed to a feed 425, to a ripsaw array 415 and thence to a further outfeed 417. Conveyors, including first, second, third and additional conveyors, used in alternative embodiments may all comprise one or more lugs.

It will be further understood that in embodiments the blocks 140 fed out from the trimming and ripping steps set out above may then be fed into a finger jointing system of any of many types well known to those skilled in the art. The feeding of wood blocks 140 for finger jointing may thus be accomplished manually or by all manner of automatic transfer means.

Second Embodiment

In a second embodiment generally described with particular reference to FIGS. 9, 13, 15, 16, 17, 28 there is disclosed a trimming unit 6 for trimming a wood block 140. The trimming unit 6 may comprise a conveyor 150, a processor and a wood block positioner 210. The conveyor 150 may be able to carry a wood block 140 having first and second ends 142, 144, and may have first and second lateral edges 152, 154, a conveyor surface 156, and an associated direction of travel 161. The wood block positioner 210 may be actuable by said processor, and may comprise a first paddle 220 moveable along the direction of travel 161 of the conveyor 150 and transversely inwardly across and above the conveyor 150 to position the first end 142 of the wood block 140 relative to a first trimsaw 20.

In alternative variant embodiments the trimming unit 6 may further comprise a second paddle 230 moveable to position the second end 144 of said wood block 140 relative to a second trimsaw 21. In alternative embodiments the trimming may be preparation for finger jointing.

The unit 6 may be for preparing a wood block 140 for finger jointing. The unit 6 may comprise: a longitudinally extending first conveyor 100 having a first conveyor surface 120 and an associated first direction of travel 102; and may comprise an infeed 410 for transversely delivering onto the first conveyor 100 a wood block 140 extending longitudinally between first and second ends 142, 144; a scanning unit 130 for scanning the wood block 140 while on the first conveyor 100. In particular embodiments the unit 6 may comprise a processor connected to or comprised within the scanning unit 130 for calculating a cutting solution for the wood block 140 and a second conveyor 150 for accepting the wood block 140 from the first conveyor 100. The second conveyor 150 may have a first and second lateral edges 152 and 154, a second conveyor surface 156, and an associated second direction of travel 161. In particular embodiments the trimming unit 6 may comprise a wood block positioner 210 operably connected to and actuable by a first processor, the positioner 210 may comprise a first paddle 220 and may comprise a second paddle 230, the paddles being moveable along the direction of travel 161 of the second conveyor 150 and transversely inwardly from the edges 152,154 across and above the surface of the second conveyor 156. In particular embodiments the first paddle 220 may be moveable against the wood block 140 to position the first end 142 of the wood block 140 relative to a first calculated cutting line and a first trimsaw 20 may be provided for trimming the first end 142 of the wood block at the first calculated cutting line. In particular embodiments the second paddle 230 may be moveable against the wood block 140 to position the second end 144 of the wood block relative to a second calculated cutting line and a second trimsaw 21 may be provided for trimming the second end 144 of the wood block 140 at the second calculated cutting line. In particular embodiments the unit may comprise an outfeed 30 for accepting from the second conveyor 150 the trimmed wood block 140 as trimmed by the first and second trimsaws 20, 21.

As explained with reference to other alternative embodiments, in some embodiments the trimming unit 6 and positioner 210 may comprise a plurality of the first paddles 220, a plurality of second paddles 230, or pluralities of first paddles 220 and second paddles 230 and the wood block 140 may be associated with a location on the second conveyor surface 156 and an individual one of the first paddles 220 or of the second paddles 230 or of first and second paddles 220, 230 may be moveable in the second direction of travel 161 of the second conveyor 150 substantially synchronously with the location. In alternative embodiments the location may be associated with a lug 158 or other equivalent structure or feature.

In alternative embodiments the first paddles 220 may be arranged in a first paddle array 422 comprising a first paddle positioning fence 400; the first paddle positioning fence 400 may be oriented along a line converging with the second direction of travel 161 of the second conveyor 150; and individual ones of the first paddles 220 may be moveable incrementally inwardly across the second conveyor 150 through a continuous range of positions from an edge 152 of the conveyor 150. Similarly in further particular embodiments the second paddles 230 may be arranged in a second paddle array 423 comprising a second paddle positioning fence 401; the second paddle positioning fence 401 may be oriented along a line converging with the second direction 161 of travel of the second conveyor 150; and individual ones of the second paddles 230 may be moveable incrementally inwardly across the second conveyor 150 through a continuous range of positions from an edge 154 of the conveyor 150. Further details of alternative embodiments of the second embodiment are disclosed in further detail with respect to the other primary embodiments.

Third Embodiment

In a third embodiment described with reference to FIGS. 2,3, there is disclosed a scanner unit 130 for continuously scanning wood blocks 140 to be finger jointed. The scanner unit 130 may comprise: a first conveyor 100 having a first direction of travel 102 for carrying said wood blocks 140 oriented substantially transversely to said first direction of travel 102 and comprising two substantially parallel first conveyor chains 104, each having a width 110 and a surface 114 and together defining an open space 106 between the surfaces 114. The scanner unit 130 may also comprise a first sensor 132 for scanning the wood blocks 140 while they are being carried by the first conveyor 100, the first sensor 132 being operatively connected to a processor for calculating a solution for individual ones of said wood blocks 140. The first conveyor chains 104 may be sized relative to said space 106 so that scanning information is sufficient for said processor to determine a said solution for a said wood block 140.

In alternative embodiments the scanner unit 130 may further comprise a second sensor 134 operatively connected to said first processor; said first sensor 132 may be positioned above said wood block 140 and said second sensor 134 may be positioned below said wood block 140.

In alternative embodiments the scanning information is derived when said wood block 140 makes a single pass through said scanner unit 130.

In alternative embodiments the scanner unit 130 may be for preparing wood blocks 140 to be finger jointed. The scanner unit 130 may comprise: a first conveyor 100 having a first direction of travel 102 for carrying the wood blocks 140 oriented substantially transversely to the first direction of travel 102 of the first conveyor 100. Conveyor 100 may comprise two substantially parallel conveyor chains 104, each having a width (also referred to as a diameter) 110 and a surface 114 and together defining an open space 106 between the surfaces 114. There may also be provided a first sensor 132 for scanning the wood blocks 140 from above and a second sensor 134 for scanning the wood blocks 140 from below. In embodiments scanning may be completed while the wood blocks 140 are being carried by the first conveyor 120; and the first and second sensors 132, 134 may be being operatively connected to a processor for calculating a cutting solution for individual ones of the wood blocks 140. The conveyor chains 104 may be sized relative to the length of individual ones of the wood blocks 140 so that scanning information from the sensors 132, 134 is sufficient for the processor to determine a cutting solution satisfying predetermined parameters for suitable individual ones of the wood blocks 140 when the individual ones of the wood blocks 140 make a single pass through the scanner unit 130. In particular embodiments the processor may be for identifying individual ones of the wood blocks 140 for which no cutting solution satisfies the predetermined parameters.

As disclosed with reference to other embodiments alternative numbers and configurations of sensors 132, 134 and processors and alternative ranges of conveyor chain dimensions and separations may be possible in alternative embodiments.

Fourth Embodiment

In a fourth embodiment described with reference to FIGS. 19 through 25 there is disclosed a positioning paddle 300 and paddle assembly 299 for positioning a wood block 140 at a transverse position on a conveyor 150, the paddle 300 may comprise an extending portion 302 having an end 304, and the end may be resilient, which resilience may be associated with a part 306 of the end portion and may be a brush 306. In alternative embodiments the paddle 300 may comprise a plurality of individual ends 304, and may comprise a brush 306. As set out in greater detail with respect to alternative embodiments the brush 306 may have bristles 311, which may have a range of thicknesses, and the paddle 300 may be mounted on a cam and may move along a paddle positioning fence 400. In particular embodiments the conveyor 150 has a surface 156 and an edge 152, 154 and the paddle 300 is moveable transversely inwardly from the edge over the surface 156. In particular embodiments the paddle 300 has a direction of travel and the paddle 300 may be moveable along the direction of travel substantially synchronously with the conveyor 150.

An embodiment of paddle assembly 299 (which may be a first paddle 220 or second paddle 230) is shown in different views in accompanying FIGS. 20 through 25 and is also seen in operation in other Figures. The paddle 300 may comprise a supporting portion 302 and an end 304 of which a part, in this case brush 306, may be resilient. As is disclosed in reference to other embodiments the specific details of resilience and paddle design will be readily adjusted by those skilled in the art to suit specific requirements.

Fifth Embodiment

In a fifth embodiment as illustrated particularly with reference to FIG. 1 the systems and methods disclosed comprise a series of steps. In a first step (900) blocks 140 may first be fed to a first conveyor 100. This feeding may be accomplished by a variety of infeeds 410 as disclosed herein. On the first conveyor 100, in a next step (902) a block 140 may be scanned by the scanner unit 130 and data collected and fed (904) to a first, second, third or other processors. The appropriate processor processes (906) the data relating to a given block 140. The processor then determines whether a cutting solution (920) is possible for the block 140. If a cutting solution (920) is determined to be possible for the block 140 then the processor initiates a series of actions (908) commencing with the determination (922) of a cutting solution. Once a cutting solution (920) has been determined the processor may actuate an appropriate first paddle 220 to position the block 140 for trimming of the first end 142 thereof (924). When a first end trimming, if necessary, has been accomplished the processor may actuate a second paddle 230 to position the block for trimming of the second end 144 thereof (926). The trimmed block may then be fed (928) to a ripsaw 416 where appropriate, as directed by the processor in response to the cutting solution (920) that has been determined for the block 140. From the ripsaw 416 the block 140 may be fed (930) to a ripsaw outfeed 417. From the ripsaw outfeed 417 the block 140 may be fed directly (932) into a finger jointing system of appropriate design, which design will be readily selected and implemented by those skilled in the art, or may alternatively be fed (934) into some alternative system, or stacked, packaged or otherwise processed.

If the first or other processor on processing (906) the block data determines that no cutting solution is possible for the block 140 then the block 140 is processed according to a second decision tree (910) and may be rejected (950) from the conveyor 100 by a suitable kicker 250 or equivalent device and a suitable replacement block 140 may be fed from a reservoir 22 to replace the rejected block 140 as indicated at (952).

It will be appreciated that a variety of refinements and amendments to the foregoing embodiment will be readily recognized and implemented by those skilled in the art. Details of specific elements are disclosed herein with reference to alternative embodiments.

Further Embodiments

In further embodiments there are disclosed methods, systems and kits for trimming wood blocks 140 for finger jointing using the systems and methods described in particular alternative embodiments. In further embodiments there are disclosed methods, systems and kits for positioning wood blocks 140 on conveyors 100, 150. In further embodiments there are disclosed methods, systems and kits for automatically determining desired properties of wood blocks 140 and for determining processing solutions for the blocks 140. In further alternative embodiments there are disclosed methods for trimming a wood block 140 comprising trimming the wood block 140 using a system, scanning unit 130, positioning unit or paddles assemblies 299 according to any one of the other embodiments. In further alternative embodiments there are also disclosed wood blocks 140 made using any of the other embodiments. In further alternative embodiments there is disclosed the use of a system, apparatus, or method comprising any of the embodiments to process a wood block 140.

The embodiments presented herein are illustrative of the general nature of the subject matter claimed and are not limiting. It will be understood by those skilled in the art how these embodiments can be readily modified and/or adapted for various applications and in various ways without departing from the spirit and scope of the subject matter disclosed and claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed.

The invention claimed is:

1. A trimming unit for trimming a wood block having a first end and a second end, the trimming unit comprising:
 a conveyor having first and second lateral edges, a conveyor surface, and a direction of travel;
 a processor;
 a trimsaw disposed adjacent to the conveyor;
 and a wood block positioner operatively located over the conveyor surface and actuable by the processor, the wood block positioner comprising
 a paddle actuable to move along the direction of travel of the conveyor at substantially the same speed as the conveyor and transversely to the direction of travel of the conveyor to a predetermined position, the paddle adapted to engage the wood block on the conveyor surface for positioning the first end of the wood block relative to the trimsaw.

2. The trimming unit according to claim 1, further comprising an opposed end stop, wherein the paddle holds the wood block in the position relative to the trimsaw without urging the wood block against the end stop.

3. The trimming unit according to claim 1, further comprising a paddle positioner fence, wherein the paddle is associated with the paddle positioner fence and when the first end of the wood block reaches the position relative to the trimsaw the paddle disengages from the fence and holds the wood block in the position relative to the trimsaw for cutting by the trimsaw.

4. The trimming unit according to claim 1, wherein the conveyor comprises chains, and the chains comprise lugs for engaging the block, and further comprising a resistive member for urging the block against the lugs.

5. The trimming unit according to claim 1, wherein the trimsaw is substantially fixed relative to the conveyor.

6. The trimming unit according to claim 1, further comprising a scanner unit.

7. The trimming unit according to claim 1, wherein the wood block has a length and the length is less than about 35 inches.

8. The trimming unit according to claim 1, further comprising a second paddle, and a second trimsaw, the second paddle moveable substantially synchronously with a location on the conveyor and transversely across the conveyor to a predetermined position, wherein the second paddle is adapted to thereby position the second end of the wood block relative to the second trimsaw.

9. The trimming unit according to claim 1, further comprising a plurality of paddles and a paddle positioning fence converging with the direction of travel of the conveyor, wherein the paddles are arranged along the paddle positioning fence.

10. The trimming unit according to claim 9, wherein the paddle positioning fence converges with the direction of travel of the conveyor at an angle of between about 10 degrees and about 20 degrees.

11. The trimming unit according to claim 1, wherein the first paddle comprises a flexible end portion.

12. The trimming unit according to claim 1, wherein the trimsaw is fixed relative to the conveyor.

13. An apparatus for sequentially trimming wood blocks each having a first end and a second end, the apparatus comprising:
(a) a processor for calculating a trimming solution for each of the wood blocks; and
(b) a trimming unit actuable by the processor, the trimming unit comprising:
  (i) a conveyor having first and second lateral edges, a conveyor surface and a direction of travel;
  (ii) a wood block positioner operatively located over the conveyor surface and adapted for positioning the first end of each of the wood blocks relative to the trimsaw, the wood block positioner comprising a first paddle adapted to engage each of the wood blocks on the conveyor surface and moveable transversely to the direction of travel of the conveyor and at substantially the same speed as the conveyor along the direction of travel; and
  (iii) a fixed trimsaw proximate the first lateral edge of the conveyor and adapted for trimming the first end of the wood block.

14. The apparatus according to claim 13, further comprising an opposed end stop, wherein the paddle is adapted to hold the wood block in a desired position on the conveyor without urging the wood block against the end stop.

15. The apparatus according to claim 13, wherein the trimming unit further comprises a second paddle, and a second fixed trimsaw proximate the second lateral edge of the conveyor, wherein the second paddle is actuable by the processor for positioning the second end of each wood block for trimming by the second trimsaw.

16. The apparatus according to claim 13, further comprising an overhead transfer, wherein the first paddle is mounted on the overhead transfer.

17. The apparatus according to claim 13, wherein the wood block has a length and the length is less than about 30 inches.

18. The apparatus according to claim 13, wherein the conveyor comprises a plurality of lugs for engaging the blocks, and further comprising an overhead resistive member for urging each block against one of the lugs.

19. The apparatus according to claim 13 wherein each the paddle is mounted above its associated conveyor.

20. The apparatus according to claim 13, further comprising a scanner unit, wherein each block passes through the scanner unit.

21. The apparatus according to claim 13, wherein the paddle has a flexible end portion.

22. The apparatus according to claim 21, wherein the end portion is a brush.

23. The apparatus according to claim 13, wherein the conveyor comprises a chain, wherein the chain is less than about 1 inch wide.

24. The apparatus according to claim 13, further comprising a plurality paddles, and a paddle positioning fence, wherein the paddles are arranged along the paddle positioning fence and the processor selectively actuates individual ones of the paddles to move incrementally inwardly over the conveyor surface to adopt a predetermined position for selectively positioning one of the wood blocks.

25. The apparatus according to claim 24, wherein the paddle positioning fence is above the conveyor and converges with the direction of travel of the conveyor at an angle of between about 10 degrees and about 20 degrees.

26. A method for trimming a wood block on a conveyor having first and second lateral edges and a direction of travel, the method comprising the steps of:
providing a processor;
providing a first positioning paddle operatively located above the conveyor and adapted to engage the wood block on the conveyor;
moving the paddle in the direction of travel of the conveyor at substantially the same speed as the conveyor over a distance and incrementally across the conveyor transverse to the direction of travel to a predetermined position by relative to the first and second lateral edges; and
positioning the wood block relative to the first lateral edge of the conveyor moving the paddle in response to a signal from the processor.

27. The method according to claim 26, further comprising the steps of providing a trimsaw fixed relative to an edge of the conveyor, and trimming the wood block with the trimsaw.

28. The method according to claim 26, wherein the paddle holds the block in the position without urging the block against an opposed end stop.

29. The method according to claim 26, further comprising the step of sequentially trimming a plurality of wood blocks.

30. The method according to claim 29, wherein the wood block is less than about 30 inches long.

31. The method according to claim 26, further comprising the steps of providing a second positioning paddle, providing a trimsaw adjacent a second lateral edge of the conveyor, moving the second positioning paddle, positioning the wood block relative to the second lateral edge of the conveyor, and trimming the wood block with the trimsaw.

32. The method according to claim 29, further comprising the steps of providing a plurality of lugs on the conveyor, and urging individual ones of the wood blocks against individual ones of the lugs for hold the blocks in position for trimming by the trimsaw.

\* \* \* \* \*

UNITED STATES PATENT AND TRADEMARK OFFICE
CERTIFICATE OF CORRECTION

PATENT NO. : 8,109,302 B2  
APPLICATION NO. : 11/771210  
DATED : February 7, 2012  
INVENTOR(S) : Larry Borne, Dean Kopp and Patrick Glazier Page 1 of 1

It is certified that error appears in the above-identified patent and that said Letters Patent is hereby corrected as shown below:

IN THE CLAIMS:

In column 20, Claim 26, please change lines 57-59 to:

"tion relative to the first and second lateral edges; and
positioning the wood block relative to the first lateral edge
of the conveyor by moving the paddle in response to a"

Signed and Sealed this
Twenty-seventh Day of March, 2012

David J. Kappos
*Director of the United States Patent and Trademark Office*